(12) United States Patent
Symington et al.

(10) Patent No.: US 11,381,061 B2
(45) Date of Patent: Jul. 5, 2022

(54) SYSTEM FOR SERVICING CABLE

(71) Applicants: ULC ROBOTICS, INC., Hauppauge, NY (US); CONSOLIDATED EDISON COMPANY OF NEW YORK, INC., New York, NY (US)

(72) Inventors: Alex Symington, Middle Island, NY (US); Dennis John Semet, New Hyde Park, NY (US); Caner Oktayer, West Babylon, NY (US); Aalap Rajendra Shah, Westbury, NY (US); Than Lin Htaik, Central Islip, NY (US); Patrick McHugh, Seaford, NY (US); Maggie Chow, Hartsdale, NY (US); George Murray, Glen Cove, NY (US); Luis Jerez, White Plains, NY (US); Thomas Campbell, Garrison, NY (US); Michael Baratta, Jackson, NJ (US)

(73) Assignees: ULC Technologies, LLC, Hauppauge, NY (US); Consolidated Edison Company of New York, Inc., New York, NY (US)

( * ) Notice: Subject to any disclaimer, the term of this patent is extended or adjusted under 35 U.S.C. 154(b) by 311 days.

(21) Appl. No.: 16/715,909

(22) Filed: Dec. 16, 2019

(65) Prior Publication Data
US 2020/0194978 A1   Jun. 18, 2020

Related U.S. Application Data

(60) Provisional application No. 62/780,390, filed on Dec. 17, 2018.

(51) Int. Cl.
*H02G 1/00* (2006.01)
*H02G 1/12* (2006.01)
(Continued)

(52) U.S. Cl.
CPC .............. *H02G 1/005* (2013.01); *H02G 1/12* (2013.01); *H02G 1/1248* (2013.01);
(Continued)

(58) Field of Classification Search
CPC ........ H02G 1/005; H02G 1/12; H02G 1/1248; H02G 1/1256; H02G 1/1265; H02G 1/14;
(Continued)

(56) References Cited

U.S. PATENT DOCUMENTS

| 3,168,845 A | 2/1965 | Kleiner et al. |
| 3,449,989 A | 6/1969 | Bliss |

(Continued)

FOREIGN PATENT DOCUMENTS

| CN | 205610101 U | 9/2016 |
| DE | 1190071 B | 4/1965 |

(Continued)

OTHER PUBLICATIONS

Examination Report dated Apr. 7, 2021 re App. No. EP 19216885.
(Continued)

*Primary Examiner* — Donghai D Nguyen
(74) *Attorney, Agent, or Firm* — Brooks Kushman P.C.

(57) ABSTRACT

A system for servicing cable includes a field-end assembly and a live-end assembly, each mounted on a support structure having at least one drive mechanism operable to cause relative linear movement between the field-end assembly and the live-end assembly. A drilling-and-shorting assembly can create a short circuit in a field-end of the cable, and a continuity tester can test the integrity of the short-circuit. The field end of the cable can then be ejected from the system, and an end-cap-cradle assembly can position an end cap on a live end of an electrical cable and test its installation.

13 Claims, 15 Drawing Sheets

(51) Int. Cl.
*H02G 1/14* (2006.01)
*H02G 15/04* (2006.01)

(52) U.S. Cl.
CPC ......... *H02G 1/1256* (2013.01); *H02G 1/1265* (2013.01); *H02G 1/14* (2013.01); *H02G 15/043* (2013.01)

(58) Field of Classification Search
CPC ............... H02G 1/1285; Y10T 29/532; Y10T 29/53209; Y10T 29/53261
USPC .......................................... 29/745, 747, 759
See application file for complete search history.

(56) References Cited

U.S. PATENT DOCUMENTS

| | | | |
|---|---|---|---|
| 3,922,818 A | 12/1975 | Carpenter et al. | |
| 4,512,828 A | 4/1985 | Helm | |
| 5,016,398 A | 5/1991 | Fukunaga | |
| 5,243,882 A | 9/1993 | Stepan | |
| 5,487,220 A | 1/1996 | Saitou | |
| 5,596,802 A | 1/1997 | Koch et al. | |
| 5,718,037 A * | 2/1998 | Gale | H02G 1/14 29/760 |
| 7,597,030 B2 | 10/2009 | Stepan et al. | |
| 8,438,952 B2 * | 5/2013 | Locher | H02G 1/1265 29/564.4 |
| 8,632,284 B2 | 1/2014 | Antonischki et al. | |
| 8,833,206 B2 * | 9/2014 | Sumino | H02G 1/1265 81/9.51 |
| 10,811,856 B2 | 10/2020 | Symington et al. | |
| 2013/0047814 A1 | 2/2013 | Kehl et al. | |
| 2013/0283605 A1 | 10/2013 | Furuhata | |
| 2017/0012412 A1 | 1/2017 | Symington et al. | |

FOREIGN PATENT DOCUMENTS

| | | |
|---|---|---|
| EP | 1231692 A1 | 8/2002 |
| EP | 2871734 A1 | 5/2015 |
| FR | 2732522 A1 | 10/1996 |
| JP | 2001112138 A | 4/2001 |
| JP | 2010146896 A | 7/2010 |

OTHER PUBLICATIONS

Office Action re U.S. Appl. No. 15/204,591 dated Sep. 6, 2019.
Office Action re U.S. Appl. No. 15/204,591 dated Jan. 3, 2020.
Search Report dated Nov. 8, 2016 re App. No. EP 16178611.
Examination Report dated Feb. 19, 2018 re App. No. EP 16178611.
Search Report dated Mar. 19, 2020 re App. No. EP 19216885.
Search Report dated Jun. 4, 2020 re App. No. EP 19216885.

* cited by examiner

SYSTEM FOR SERVICING CABLE

CROSS-REFERENCE TO RELATED APPLICATIONS

This application claims the benefit of U.S. provisional application Ser. No. 62/780,390 filed Dec. 17, 2018, the disclosure of which is hereby incorporated in its entirety by reference herein.

TECHNICAL FIELD

The present disclosure relates to a system for servicing cable.

BACKGROUND

Because of the high density of demand for electric power in urban areas, an underground distribution network system is commonly used. The distribution network system typically includes conduits under the street pavement with primary splicing structures—e.g., manholes—every 300 to 500 feet and secondary splicing structures—e.g., secondary boxes—every 100 to 150 feet. Distribution-network feeders operate at different voltages—for example, in some applications, 13 kilovolt (kV) and 27 kV feeders are commonly used. The distribution-network feeders consist of three cables that are A, B, and C phase. These feeders are installed in conduits to transport electricity from the supply substation to several distribution-network transformers. Unlike overhead open-wire feeders, where larger clearances are available to facilitate live-line work, underground cable feeders may need to be de-energized in order to perform work. Because of the multipath characteristics of a network system, a feeder outage may not be immediately reflected in customer outages, but instead, may result in added stress to the components remaining in service and lower supply voltage to customers.

A live end-cap (LEC) is a splice that is often used during adverse system conditions to expedite feeder restoration. An LEC process includes separating a cable connection and insulating part of it to allow the selected portion of the feeder to be re-energized. Once an LEC is installed, a smaller, less critical portion of the feeder is dropped, and the rest of the feeder is energized back into service. Installing an LEC may be simpler and quicker than performing a complete repair during an outage. Despite advances in the process for installing LEC's, a need exists for a system and method of servicing a cable—for example, to install a live end-cap or to splice one or more cable sections together to create a single conductive path—that utilizes one or more machines to perform tasks that would otherwise need to be performed manually by technicians, and which may provide an automated or semi-automated system and process to improve the installation tasks.

SUMMARY

Embodiments described herein include a system for servicing cable. The system may include a chassis that supports two assemblies: a field-end assembly for performing operations on a field end of an electrical cable, and a live-end assembly for performing operations on a live end of the electrical cable. The chassis may be constructed with one or more rails that facilitate linear movement of one or both of the assemblies. At least some embodiments may include stationary tubes that serve as supports for a set of outer tubes to provide telescoping action for moving one of the assemblies linearly along the rails. Some embodiments may also or alternatively include a lead screw connected to a motor drive for moving one of the assemblies linearly toward and away from the other of the assemblies.

Embodiments described herein may further include various systems, subsystems, assemblies, and subassemblies capable of performing one or more operations on an electrical cable. For example, some embodiments may include a drilling-and-shorting assembly for creating a short circuit in a field-end of the cable, and may also include a continuity tester for testing the integrity of the short-circuit. Some embodiments may include an end-cap cradle assembly for positioning an end cap on a live end of an electrical cable. Embodiments may also include one or more tools for cutting an electrical cable; removing one or more layers of insulation, and ejecting the cable from the system. Embodiments described herein may not only automate and simplify processes currently performed manually, but may also allow some steps required with a manual process to be completely eliminated, thereby further increasing speed and efficiency of the process.

At least some embodiments described herein may include a system for servicing cable that includes a support structure and first and second tool arrangements. The first tool arrangement is supported on the support structure and includes an opening configured to receive a cable in a direction transverse to a cable axis and at least one tool operable to perform one or more operations on a cable received in the opening. The second tool arrangement is supported on the support structure and includes at least one tool operable to perform one or more operations on a cable received by the first tool arrangement. At least one of the first or second tool arrangement is movable axially along the support structure relative to the other tool arrangement. A guide arrangement includes a plurality of guide elements, and a drive arrangement is configured to move at least one of the guide elements into contact with and apply a force to a cable received by the first tool arrangement. The drive arrangement is operable to vary the force to adjust a position of a cable received by the first tool arrangement.

At least some embodiments described herein may include a system for servicing cable that includes a support structure and first and second tool arrangements supported on the support structure. At least one of the tool arrangements is movable axially relative to the other tool arrangement. The first tool arrangement includes a center portion configured to receive a cable therein, and further includes at least one tool operable to perform one or more operations on a cable received in the center portion. A plurality of guide elements are movable radially outward away from the center portion of the first tool arrangement to facilitate positioning of a cable in the center portion, and they are movable radially inward toward the center portion to exert forces on and secure a cable in the center portion of the first tool arrangement. At least one of the guide elements is separately movable from at least one other of the guide elements such that a position of a cable in the center portion of the first tool arrangement is adjustable by the guide elements.

At least some embodiments described herein may include a system for servicing cable that includes a support structure and a first tool arrangement supported on the support structure and having a center portion configured to receive a cable therein. A second tool arrangement is disposed axially adjacent to the first tool arrangement and supported on the support structure. A plurality of guide elements is disposed around the center portion of the first tool arrangement, and a plurality of independently operable drive arrangements are each operable to move at least one of the guide elements away from the center portion of the first tool arrangement such that a cable is receivable by the first tool arrangement and toward the center portion of the first tool arrangement such that the guide elements secure a cable received by the first tool arrangement.

BRIEF DESCRIPTION OF THE DRAWINGS

FIG. 13 shows an end-cap-cradle assembly from the field-end assembly holding an end cap ready for installation;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
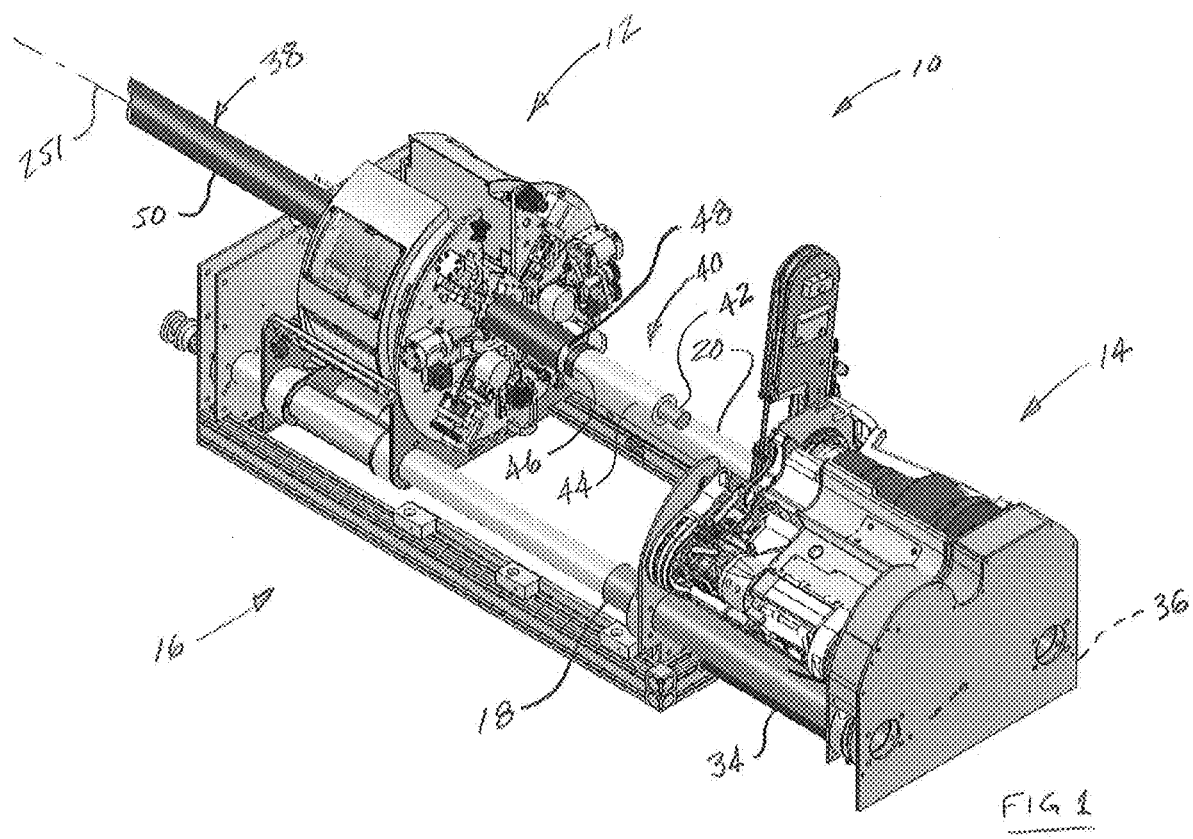
FIG. 1 shows a system for servicing cable in accordance with embodiments described herein.
Figure 2:
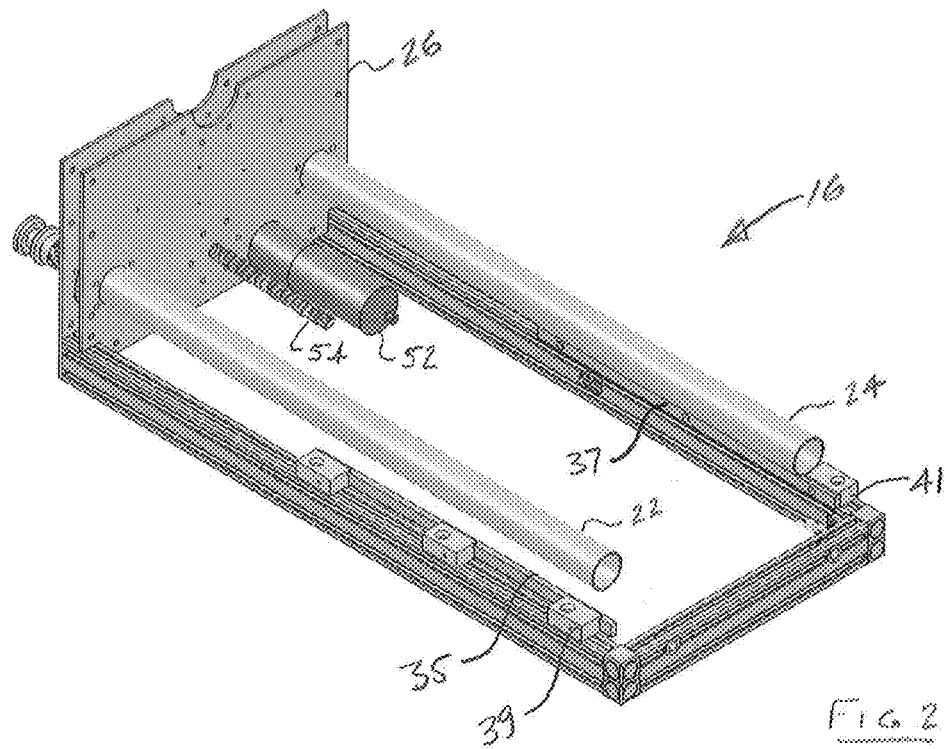
FIG. 2 shows a chassis from the system shown in FIG. 1.
Figure 3:
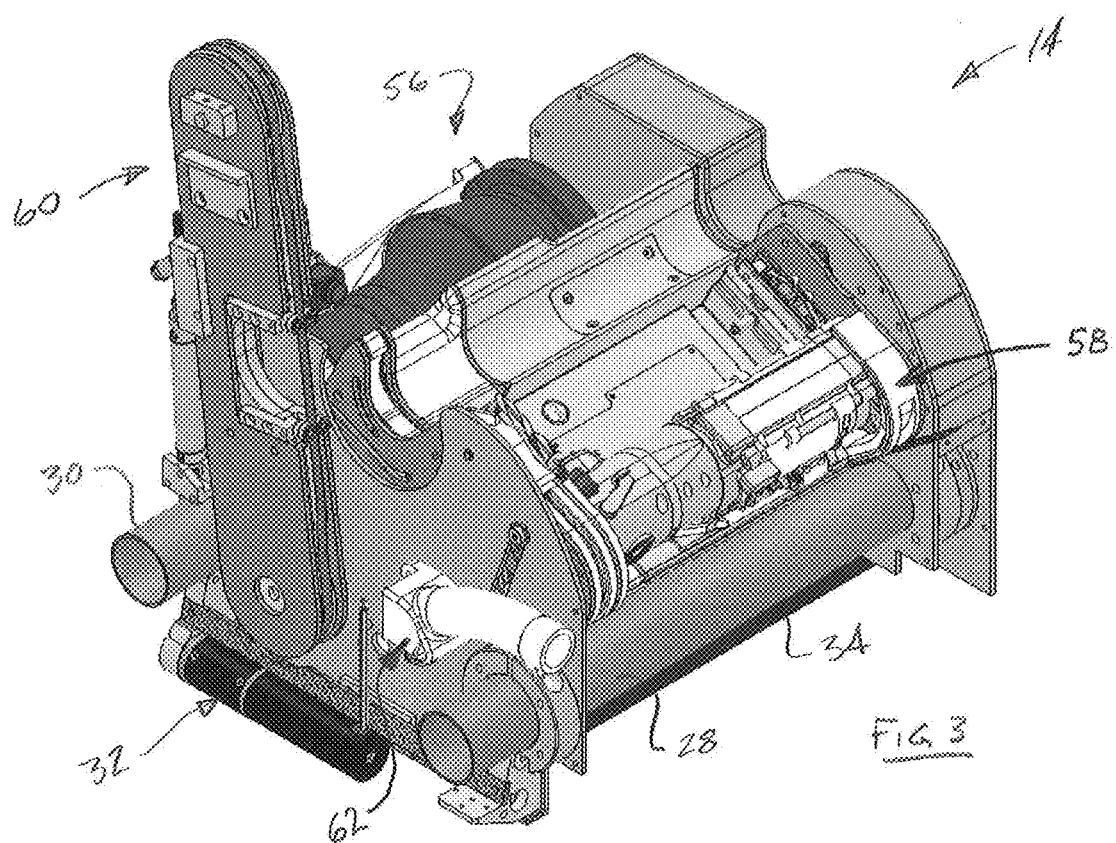
FIG. 3 shows a field-end assembly from the system shown in FIG. 1.

FIG. 1 shows a system 10 in accordance with embodiments described herein. The system 10 includes a generally cylindrical first tool arrangement, or live-end assembly 12, and a second tool arrangement, or field-end assembly 14. The assemblies 12, 14 are disposed axially adjacent to each other and are supported on a support structure or chassis 16, which includes telescoping tube arrangements 18, 20. As shown in FIG. 2, the tube arrangements 18, 20 include stationary tubes 22, 24 mounted on a chassis plate 26, which cooperate with tubes 28, 30 attached as part of the field-end assembly 14—see FIG. 3. Although the tubes 28, 30 are stationary relative to the field-end assembly 14, they move relative to the stationary tubes 22, 24 when the field-end assembly 14 moves linearly toward and away from the live-end assembly 12. FIG. 3 also shows a motor and gear arrangement 32 that is operable to move the field-end assembly 14 toward and away from the live-end the assembly 12 along a pair of support rails 34, 36—see also FIG. 1. Pinions from the motor and gear arrangement 32 move along a pair of racks 35, 37—see FIG. 2—held in place with rail caps 39, 41.

Figure 7:
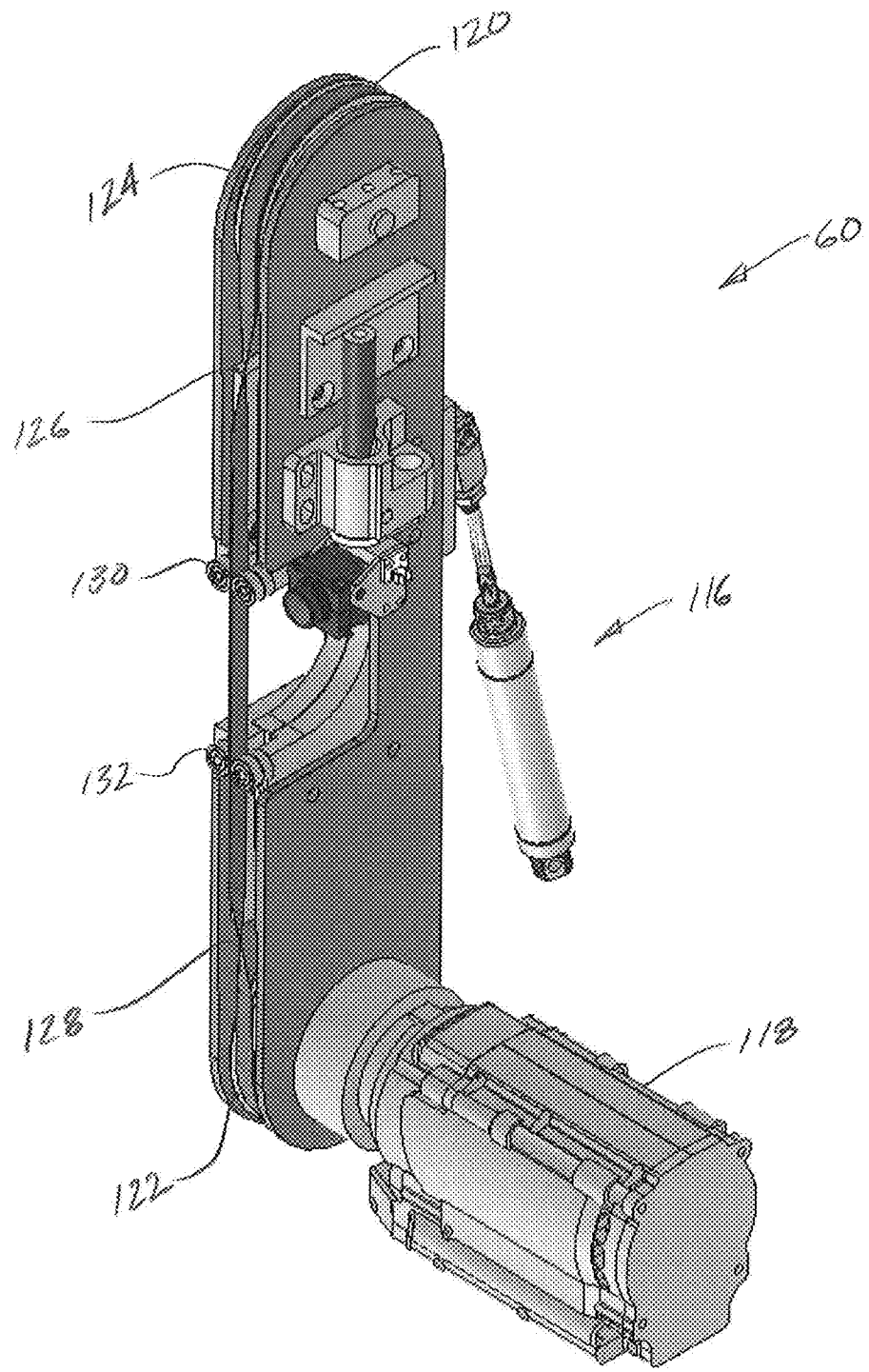
FIG. 7 shows a saw-cutting assembly from the field-end assembly.
Figure 8B:
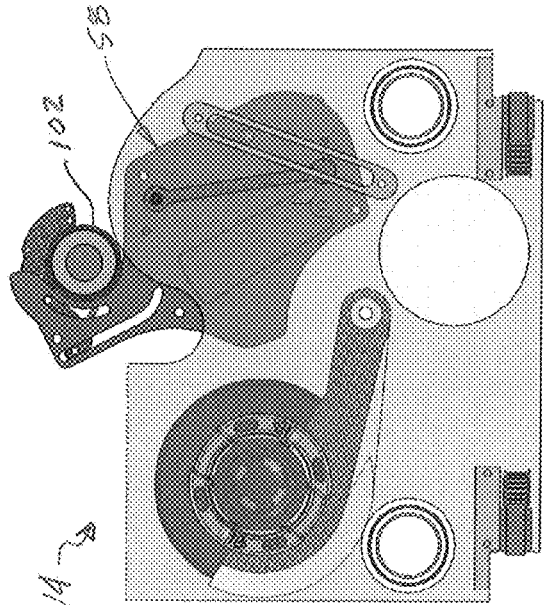
FIGS. 8A-8D show a cable-eject mechanism from the field-end assembly.
Figure 8D:
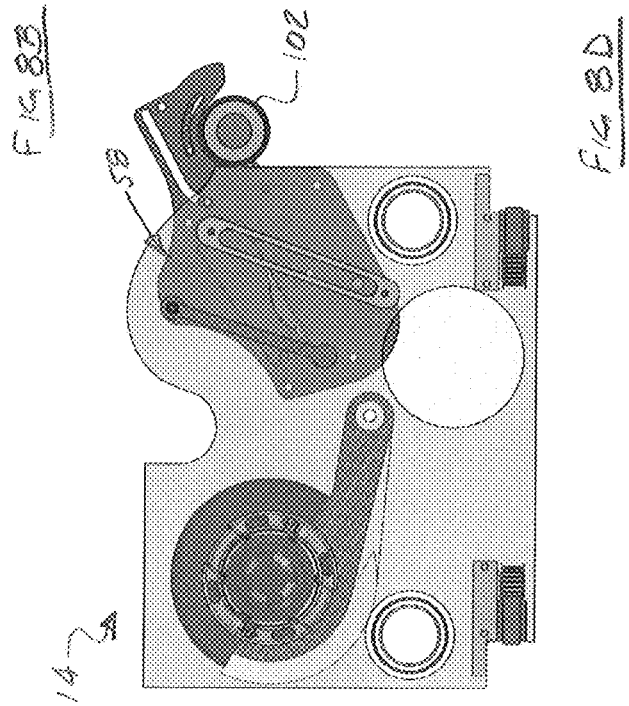
Figure 8A:
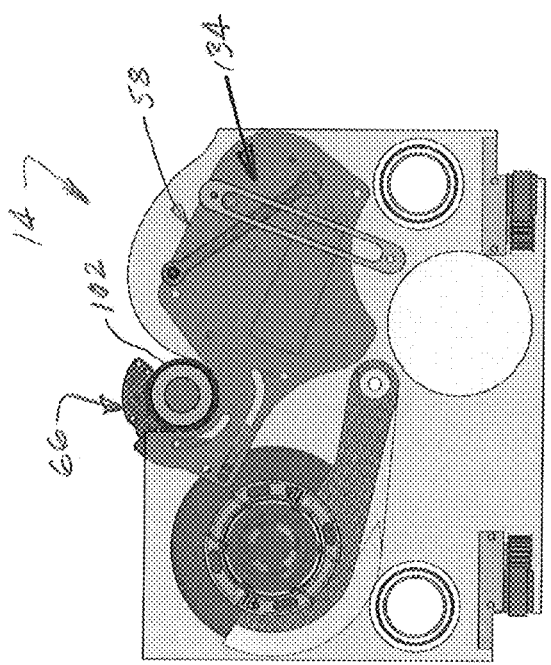
Figure 8C:
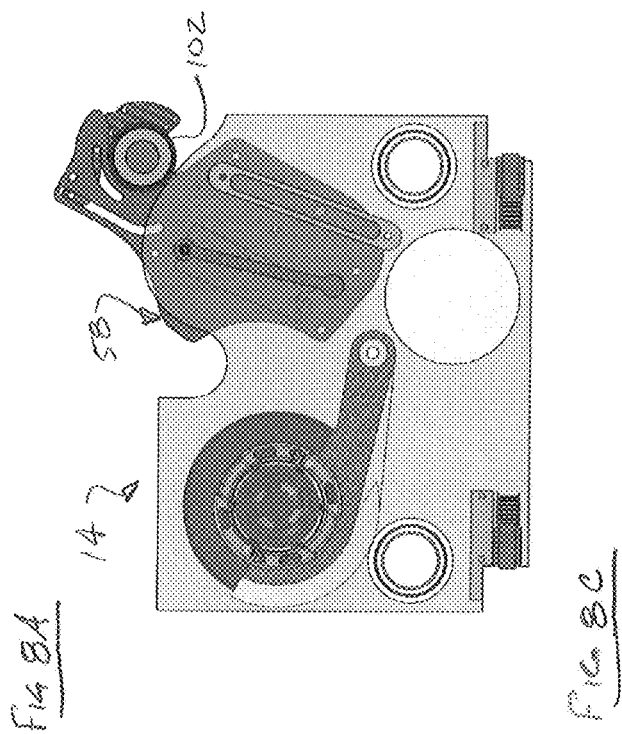

Also shown in FIG. 1 is an electrical cable 38 mounted on the live-end assembly 12 and having one end 40 prepped for application of an end-cap. The cable 38 includes a center conductor 42, and insulation layer 44, an inner layer of semi-conductive material 46, ground straps 48, and an outer insulating jacket material 50. As explained in more detail in conjunction with FIGS. 7 and 8, the live-end assembly 12 includes a number of tools operable to perform various tasks on a cable, such as the cable 38. The live-end assembly 12 is also movable along the rails 22, 24 by operating a motor 52 to drive a lead screw 54.

Figure 4:
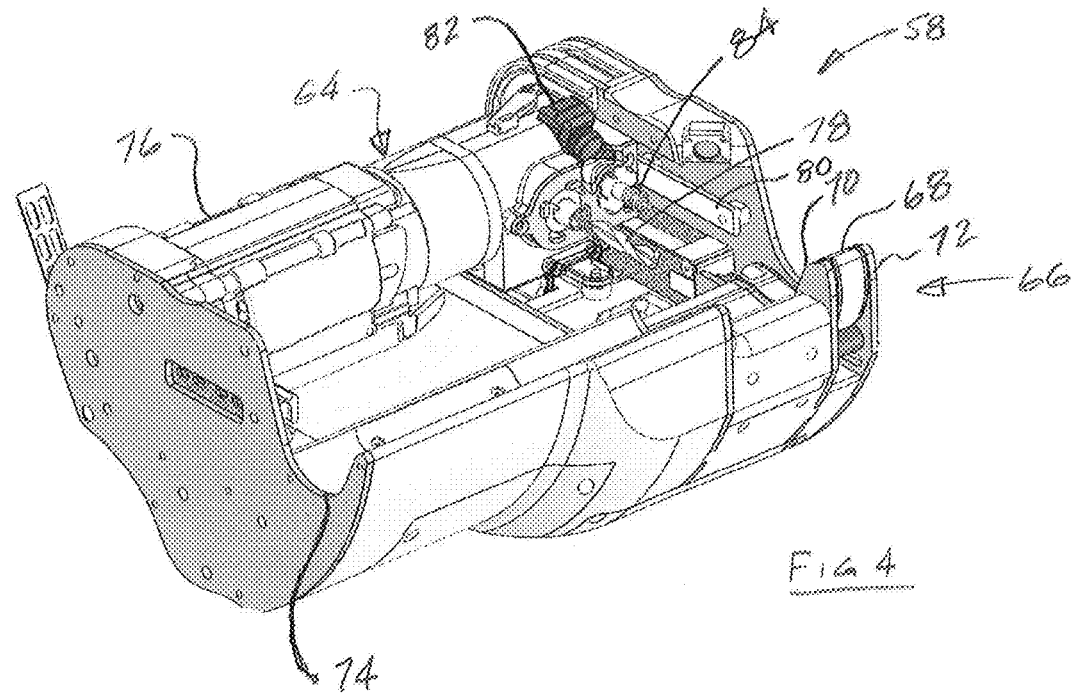
FIG. 4 shows a drilling-and-shorting assembly from the field-end assembly.

Turning to FIGS. 3 and 4, details of the field-end assembly 14 are shown. The field-end assembly 14 includes an end-cap-cradle assembly 56, a drilling-and-shorting assembly 58, a saw-cutting assembly 60, and a vacuum assembly 62, each of which is explained in more detail below. FIG. 4 shows the drilling-and-shorting assembly 58, which includes a drilling assembly 64 and a clamping mechanism 66. The clamping mechanism 66 includes a latch hook 68 and two side plates 70, 72. In the embodiment shown in FIG. 4, the latch hook 68 is made from a polymeric material and the two side plates 70, 72 are made from a carbon-fiber composite material, although the use of other materials for the latch hook and side plates is contemplated. The clamping mechanism 66 is used to lock into place an electrical cable, such as the cable 38 shown in FIG. 1 when the cable is placed in a trough 74 of the drilling-and-shorting assembly 58. The clamping mechanism 66 securely holds the cable while the drilling assembly 64 short-circuits and tests the cable.

The drilling assembly 64 includes a motor 76 operable to rotate a drill bit 78 to penetrate a cable when it is positioned in the trough 74. The drill assembly 64 is linearly movable along a track 80 such that it approaches a cable positioned in the trough 74 in a radial direction relative to the cable. Because the entire drilling-and-shorting assembly 58 moves linearly along the racks 35, 37, the drilling assembly 64 can be operated to produce holes in a line along the length of the cable. The clamping mechanism 66 can be used to secure the cable just prior to operating the drill assembly 64, and then it can be released to allow the drilling-and-shorting assembly 58 to move linearly relative to the cable to reposition the drill bit 78. A camera 82 is positioned proximate to the drill bit 78 to allow an operator to observe the positioning and operation of the drill bit 78. The vacuum assembly 62 can be run during or after operation of the drill assembly 64 to collect debris generated during the drilling operation. As explained in more detail in conjunction with FIGS. 5 and 6, the drilling-and-shorting assembly 58 also includes a test probe 84 that is used to test the effectiveness of the short-circuit produced by the drill bit 78.

Figure 5:
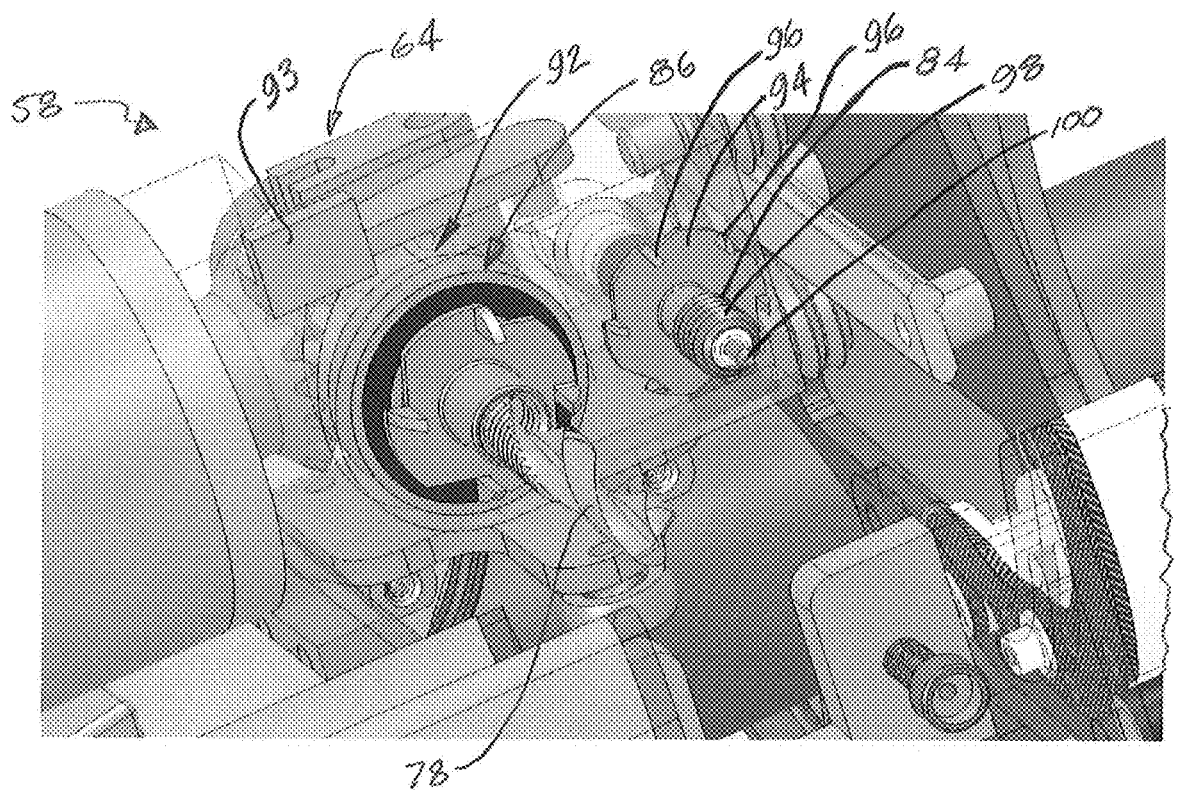
FIG. 5 shows a drill assembly, including a cable continuity tester from the drilling-and-shorting assembly.
Figure 5A:
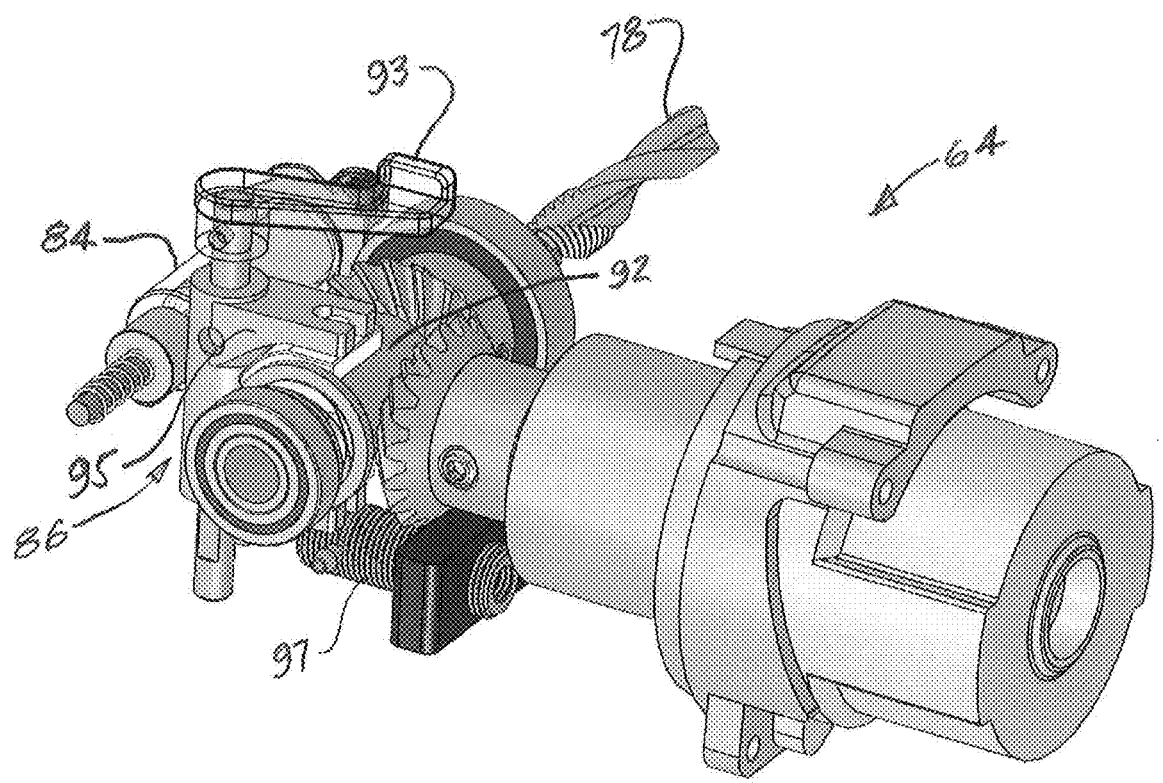
FIG. 5A shows details of the drill assembly.

FIG. 5 shows the drilling-and-shorting assembly 58, including the drill bit 78 and the test probe 84. The drill assembly 64 is configured to hold the drill bit 78 with an ejection mechanism 86 so the drill bit 78 can be quickly released while inside the cable so that it can remain in the cable and maintain a short circuit. In the embodiment shown in FIG. 5, the drill bit 78 has a hexagonal shank 88 with an area of relief 90—see FIG. 6—into which small ball bearings can fit. A collar 92 of the drill-bit-eject mechanism 86 maintains the ball bearings in the relief 90 of the shank 88, but when it is retracted by a lever 93 or a piston 97, the ball bearings are free to move out of the relief area 90 and the drill bit 78 can be removed from the drill assembly 64. FIG. 5A shows another view of the drill assembly 64. Rotating the lever 93 in a clockwise direction—as it is oriented in FIG. 5A—causes rotation of a yoke 95, which in turn retracts the sleeve 92 to allow the drill bit 78 to be released.

Figure 6:
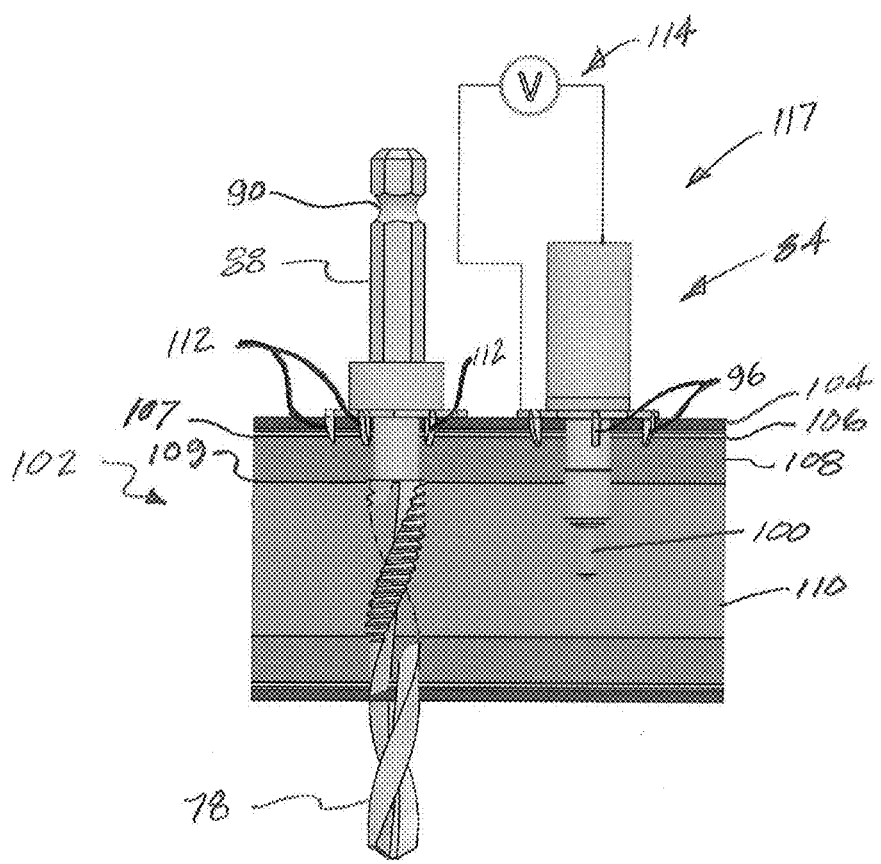
FIG. 6 shows the cable continuity tester in use.

Returning to FIG. 5, it is shown that the test probe 84 includes a flange 94 configured with a number of sharp probes 96, only some of which are labeled for clarity. The probes 96 are configured to penetrate an insulating jacket layer of a cable and make electrical contact with the ground straps. The test probe 84 also includes an insulating material 98, which surrounds a conductor 100 positioned in the center of the test probe 84. FIG. 6 shows the drill bit 78 and the test probe 84 both inserted into a field end of an electrical cable 102. The electrical cable includes an insulating jacket 104, a layer of ground straps 106, a thin semiconductor layer 107, a relatively thick insulating layer 108, another thin semiconductor layer 109, and a center conductor 110. As shown in FIG. 6, the drill bit 78 has been ejected from the drill assembly 64 and forms a short circuit between the ground straps 106 and the center conductor 110. As part of the drilling-and-shorting process, the drill bit 78 is used to create a hole for the probe 84, which may have a depth approximately one half the diameter of the cable 102. Next, the field-end assembly 14 is moved linearly so that the drill bit 78 can make a second hole through the cable 102; the drill bit 78 is then ejected from the drill assembly 64 and remains in the cable 102.

As shown in FIG. 6, the drill bit 78 includes a number of sharp probes 112 similar to the probes 96 on the test probe 84. The probes 112 make a good electrical contact with the ground straps 106, while a cutting portion of the drill bit 78 makes electrical contact with the center conductor of the cable 102, thereby creating the short circuit. The test probe 84 is connected to a continuity tester 114, and together, the test probe and continuity tester may conveniently be referred to as a test arrangement 117. The test arrangement 117 may emit a signal to a remote position, such as a remotely-positioned operator control panel indicating the continuity—e.g., the electrical resistance—between the center conductor 110 and an outer conductor, in this case the ground straps 106, of the cable 102. The signal may, for example, be sent wirelessly to an operator control panel or other device so that an operator may confirm a successful short circuit before approaching the cable.

Figure 6A:
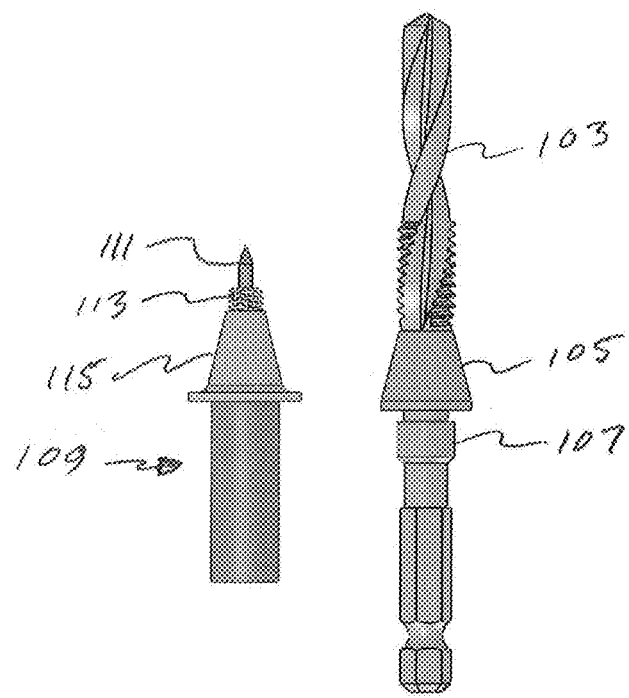
FIG. 6A shows a drill bit and continuity tester in accordance with another embodiment described herein.

As an alternative to the sharp probes 112 on the drill bit 78 and the sharp probes 96 on the test probe 84, contact can be made with the ground straps using portions of the drill bit body and the test probe body, respectively. FIG. 6A shows a drill bit 103 having a tapered portion 105 on its shank 107. The tapered portion 105 is configured to wedge itself into the hole made by the drill bit 103, thereby making contact with the ground straps, such as the ground straps 106 shown in FIG. 6. Similarly, FIG. 6A shows a test probe 109 having a conductor 111 surrounded by an insulating layer 113, similar to the test probe 84 shown in FIG. 6. Instead of the sharp probes 112, however, the test probe 109 includes a tapered portion 115 on its shank, which is configured to make contact with ground straps when inserted into a hole made by the drill bit 103.

After it is determined that the short circuit has been effectively made, a cut is made entirely through the cable 102, so that the field end can be ejected from the system 10. One way to perform this cutting is to use a saw-cutting assembly, such as the saw-cutting assembly 60 shown in FIG. 3—see also FIG. 7. The saw cutting assembly 60 includes an actuator arrangement 116 for moving the assembly 60 toward and away from an electrical cable, such as the cable 102. A motor arrangement 118 drives a band saw 120 around a pair of pulleys 122, 124. Because electrical cable, such as the cable 102 does not already have a cut end when it is placed in a system, such as the system 10, it is not possible to use a bandsaw with a standard configuration to cut through the cable. To solve this problem, the bandsaw 120 used in conjunction with the saw-cutting assembly 60 is twisted 90° at two locations 126, 128 along its length so the cutting teeth have a forward-facing aspect.

Pairs of rollers 130, 132 help to guide and keep the twisted bandsaw 120 in its proper orientation. The saw-cutting assembly 60 is configured with a stop mechanism to ensure that the actuator 116 stops moving the bandsaw 120 forward before the entire saw blade 120—including the back edge—goes through the cut cable. Once the front cutting edge of the bandsaw 120 cuts entirely through the cable, the actuator 116 may easily reverse movement of the saw-cutting assembly 60; however, if the back edge of the bandsaw 120 goes entirely through the cable, it may be very difficult to reverse movement without placing undesirable tension on the bandsaw 120.

Figure 14:
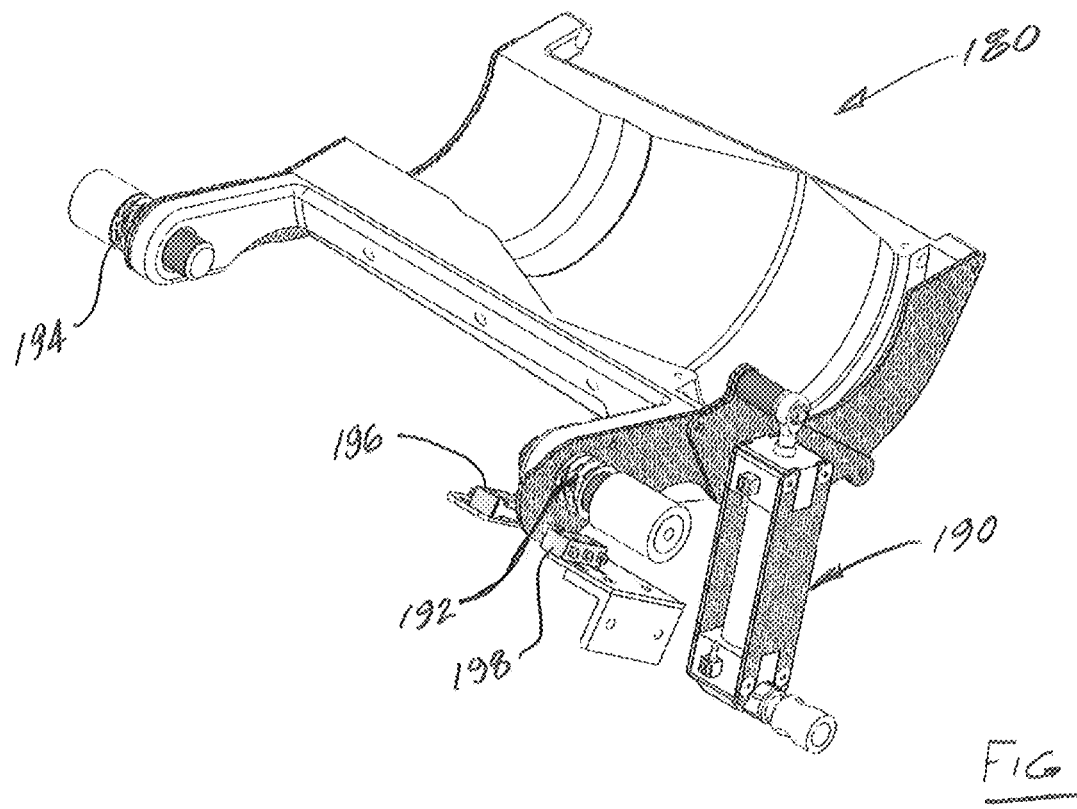
FIG. 14 shows an end-cap-cradle assembly from the field-end assembly.
Figure 15:
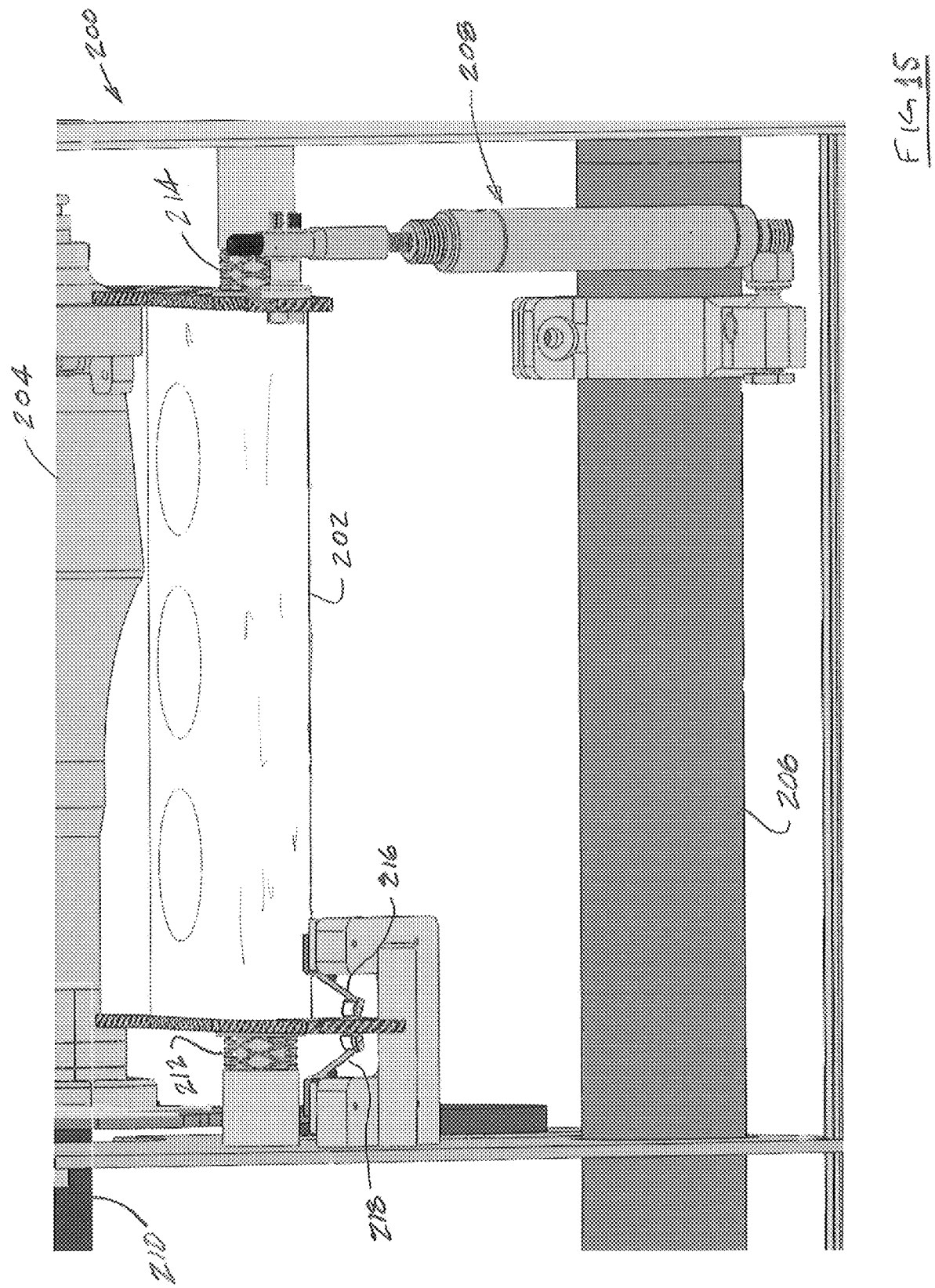
FIG. 15 shows an end cap installed on a cable end prepared for a pull-back test.

FIGS. 8A-8D show the field-end assembly 14, and how the drilling-and-shorting assembly 58 is used to eject the electrical cable 102 after it has been cut using the saw-cutting assembly 60. The clamping mechanism 66 is actuated to grab the field end of the cable 102 after it has been cut. The entire drilling-and-shorting assembly 58 is rotated—clockwise as shown in the figures—with a movement determined by a linkage arrangement 134. Ejecting the field end of the cable 102 allows the live end to be prepped for an end cap as shown in FIGS. 13-15.

Figure 9:
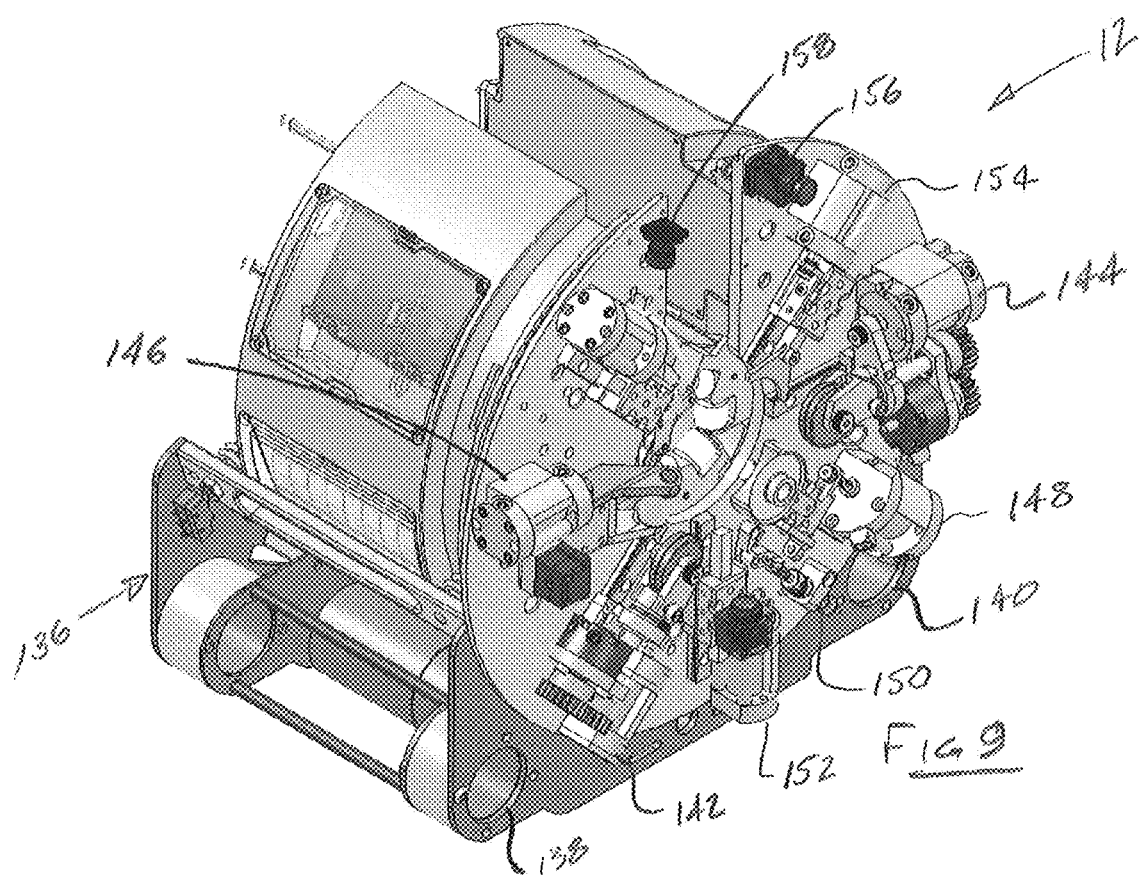
FIG. 9 shows a live-end assembly from the system shown in FIG. 1.

FIG. 9 shows the live-end assembly 12 detached from the chassis 16. The live-end assembly 12 is supported on a carriage assembly 136, which is configured to receive the chassis tubes 22, 24 in openings 138, 140. The live-end assembly 12 includes a number of tools for performing work on an electrical cable, such as the cable 38 or the cable 102. For example, it includes two scoring tools 142, 144. One of the scoring tools 142, 144 can be used to cut into an outer jacket of the electrical cable, while the other of the scoring tools 142, 144 can be used to cut into an inner layer of semiconductor material. A tool more specifically designed to remove the semiconductor layers is a rolling tool 146, the operation of which is explained in more detail below in conjunction with FIG. 12.

Figure 10:
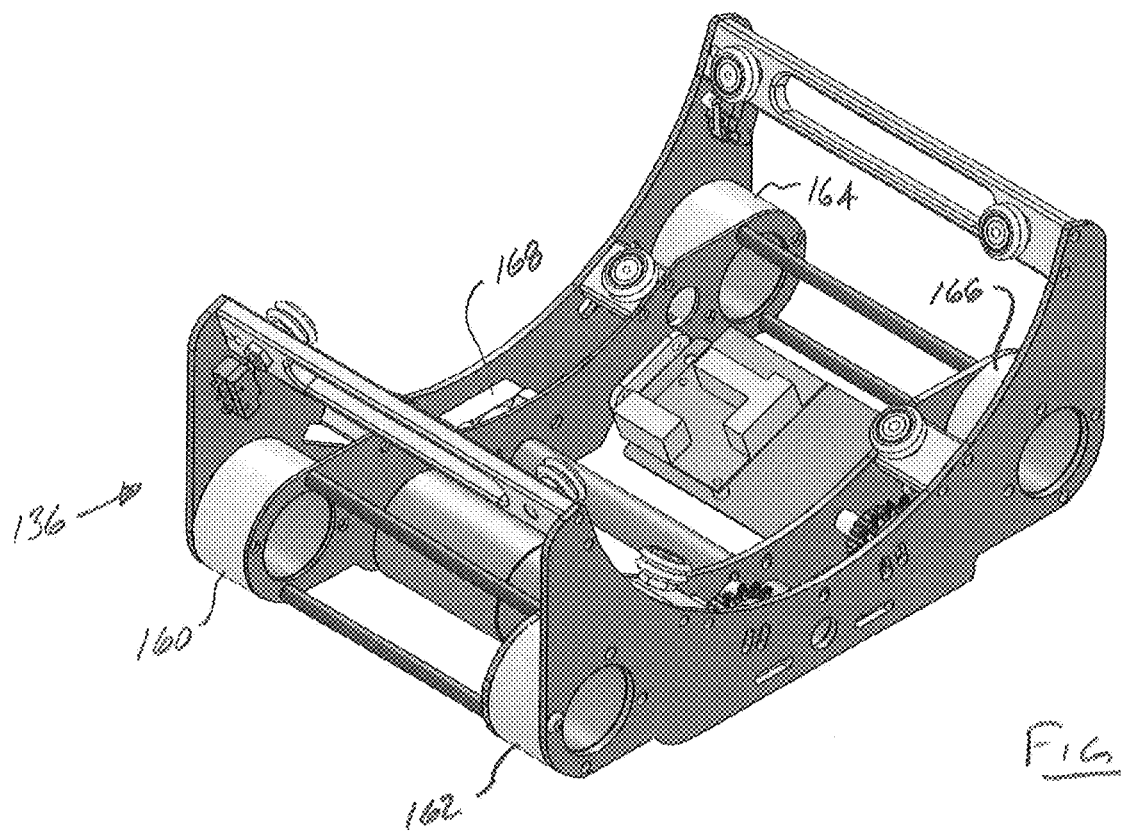
FIG. 10 shows a carriage assembly from the live-end assembly.

A cable cutter 148 is configured to cut through an outer jacket and ground straps of an electrical cable, and a stop mechanism 150 can be adjusted to provide a desired depth for the cable cutter 148. A stripping tool 152 includes a cutting portion similar to a lathe tool and is used to strip portions of the insulation from the electrical cable. A tool 154 can be used to sweep the cable to remove debris generated by the processing of the various cutters. One or more cameras, such as the cameras 156, 158 can be used to provide an operator information regarding the processing of the electrical cable. The carriage assembly 136 is shown in FIG. 10, and includes four bushings 160, 162, 164, 166, which support the carriage assembly 136 on the chassis tubes 22, 24. The carriage assembly 136 also includes a nut 168 configured to receive the lead screw 54 for moving the live-end assembly 12 toward and away from the field-end assembly 14.

Figure 11:
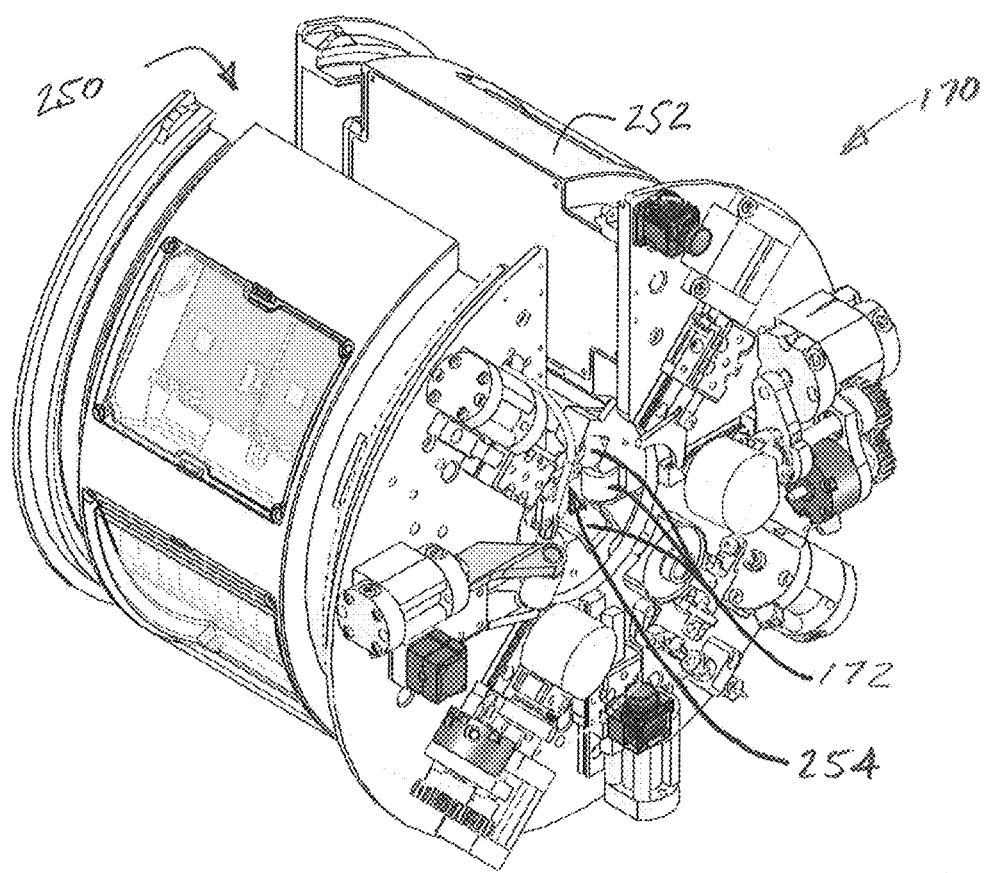
FIG. 11 shows a tool-plate assembly from the live-end assembly.

FIG. 11 shows a tool-plate assembly 170 forming a portion of the live-end assembly 12. The tool-plate assembly 170 is configured to support an electrical cable on a plurality of rolling elements, which in this embodiment are cylindrical guide rollers 172 positioned around a center of the tool-plate assembly 170. The various tools described in conjunction with FIG. 9 are mounted on the tool-plate assembly 170. In addition, the tool-plate assembly 170 may also include a heater, fans, and temperature control for heating the semiconductor layers of the cable to facilitate their removal. The tool-plate assembly 170 may also include one or more ratcheting pawls for attaching to a central core of an end cap so that it can be removed from the end cap by moving the live-end assembly 12 away from the end cap.

Figure 12:
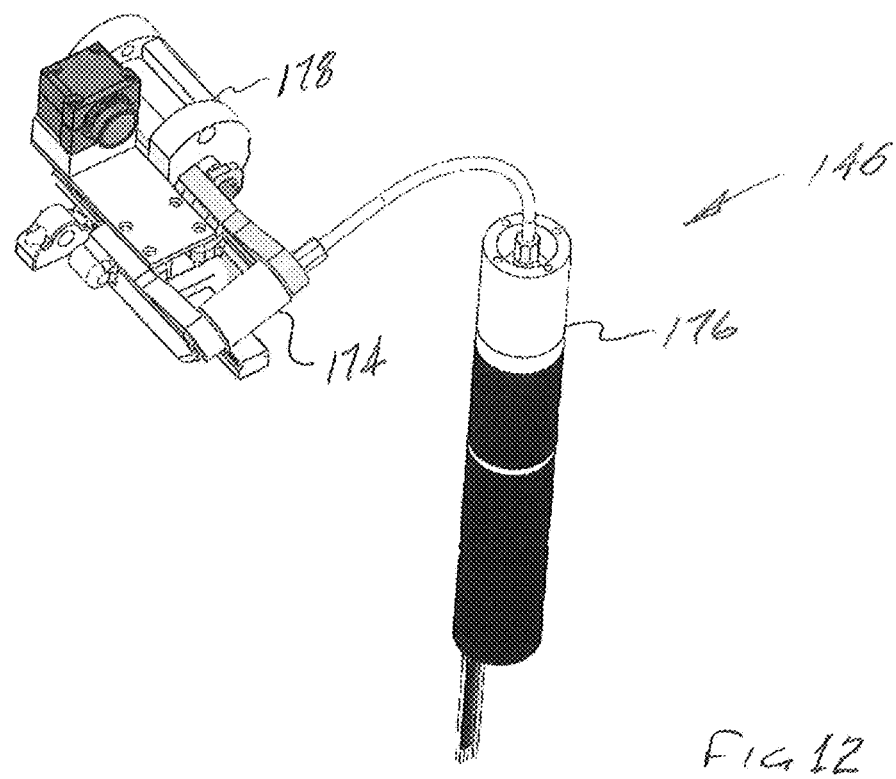
FIG. 12 shows a semi-conductor removal tool from the live-end assembly.
Figure 23:
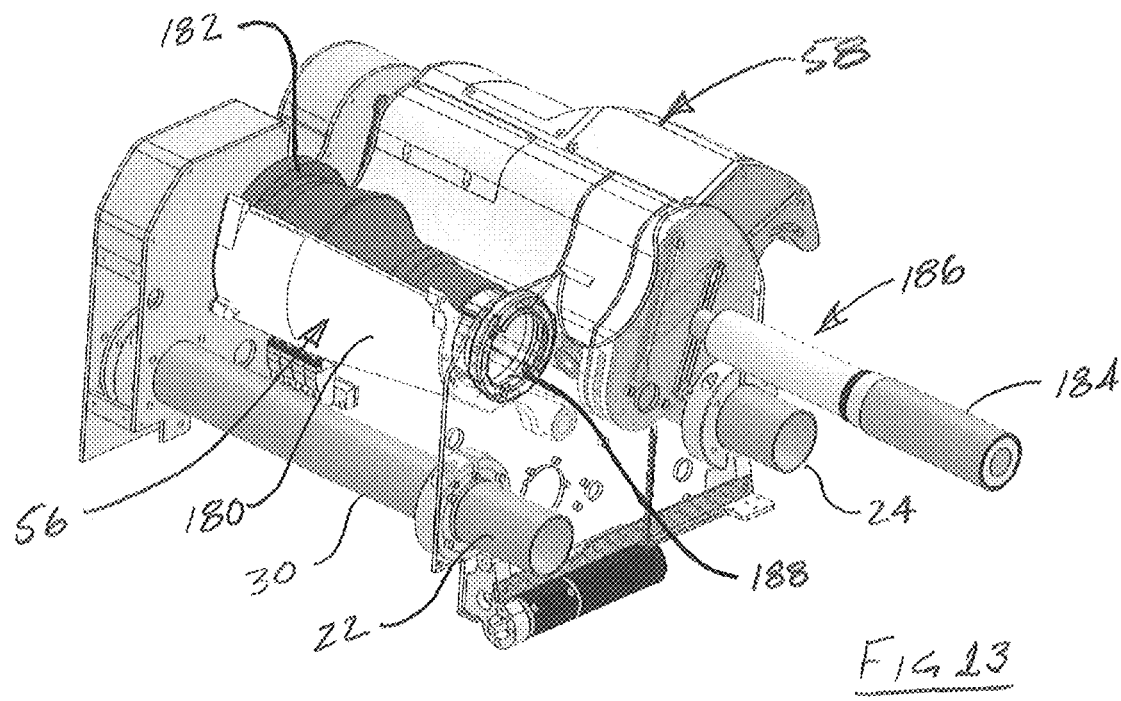

FIG. 12 shows one of the tools from the tool-plate assembly 170 in more detail. In particular, it shows the rolling tool 146. The rolling tool 146 is designed to remove one or both of the layers of semiconductor material often found on an electrical cable—see, e.g., the layers 46, 50 shown in FIG. 1 or the layers 104, 107 shown in FIG. 6. The tool 146 includes a roller 174 having a relatively smooth surface, and in some embodiments may be polished to a very smooth finish. The roller 174, which may be made from a metal alloy, is rotated and brought into contact with the semiconductor layer, which it then removes through frictional forces. The semiconductor layer may be previously scored, heat can be applied to it, or both, in order to facilitate an easy removal process. A small drive mechanism 176 is used to rotate the roller 174, and an actuator 178 is used to position it appropriately and move it as needed along different portions of the semiconductor layer. In other embodiments, a roller, such as the roller 174, may be made from other materials, such as polymers or ceramics.

FIG. 13 shows the end-cap-cradle assembly 56 in more detail. Specifically, the assembly 56 is shown positioned on the tubes 22, 24 of the chassis 16—see also FIG. 2. The end-cap-cradle assembly 56 includes a cradle 180, which in FIG. 13 is holding an end cap 182. A portion of an electrical cable 184 is also held by the live-end assembly 12, which in this view is removed for clarity. The cable 184 has a prepared end 186 ready to have the end cap 182 installed on it. The cradle 180 can be rotated such that an opening 188 in the end cap 180 is aligned with the prepared end 186 of the cable 184. FIG. 13 also shows the drill-and-shorting assembly 58 rotated in the eject position after it has ejected the field end of the cable—see also FIG. 8D.

FIG. 14 shows the cradle 180, including a portion of a drive mechanism 190 operable to rotate the cradle 180 and the end cap 182 into position. The cradle 180 also includes a spring 192 having a relatively high spring constant and a spring 194 having a lower spring constant. As explained in more detail in conjunction with FIG. 15, a pair of micro switches 196, 198 are used in conjunction with the springs 192, 194 to control the insertion force of the end cap 182 onto the cable 184, and also to test correct end-cap installation by limiting a pre-set amount of pull-off force.

FIG. 15 shows an end-cap-cradle assembly 200 similar to, but with a slightly different configuration from, the assembly 56 shown in FIG. 13. The assembly 200 includes a cradle 202 configured to hold an end cap 204. The assembly 200 is supported on a pair of tubes, including the tube 206, similar to the arrangement shown in FIG. 13. In this embodiment, an actuator assembly 208 is configured to move the cradle 202 into position so that the end cap 204 is aligned with a prepared end of an electrical cable 210. The assembly 200 also includes a spring 212 having a relatively low spring constant, and a spring 214 having a much higher spring constant. A first limit switch 216 is configured to check a position of the end cap 204 upon installation onto the cable 210. A second limit switch 218 is configured to be used as part of a pull-off test after the end cap 204 is installed onto the cable 210.

Once the end cap 204 is aligned with the cable 210, the entire end-cap-cradle assembly 200 is moved linearly—right-to-left as shown in FIG. 15—so that the end cap 204 is positioned over the prepared end of the cable 210. The movement continues until the spring 214 is compressed by a reaction force of the cable 210 acting on the end cap 204 and the limit switch 216 is tripped. The spring constant of the spring 214 can be set so that an approximate installation force is applied prior to the limit switch 216 being tripped. For example, in some embodiments, this may be approximately 40 pounds of force. In this way, the spring 214 and the limit switch 216 comprise an installation controller for the end cap configured to position the end cap 204 over the cut end of the cable 210 with a predetermined amount of installation force. When an end cap such as the end cap 204 is applied to a cable, a retaining ring in the end cap holds the end cap securely on the electrical cable. To help ensure that installation has been performed correctly, the end-cap-cradle assembly 200 is moved linearly—left-to right as shown in FIG. 15—to provide an estimation of the retention force between the end cap 204 and the cable 210. In the embodiment shown in FIG. 15, the spring constant for the spring 212 may be chosen such that approximately 5 pounds of force in the direction of removal will trip the limit switch 218. When this occurs, installation of the end cap 204 is complete. In this way the installation controller also indicates an amount of retention force between the end cap 204 and the cut end of the cable 210.

Figure 16:
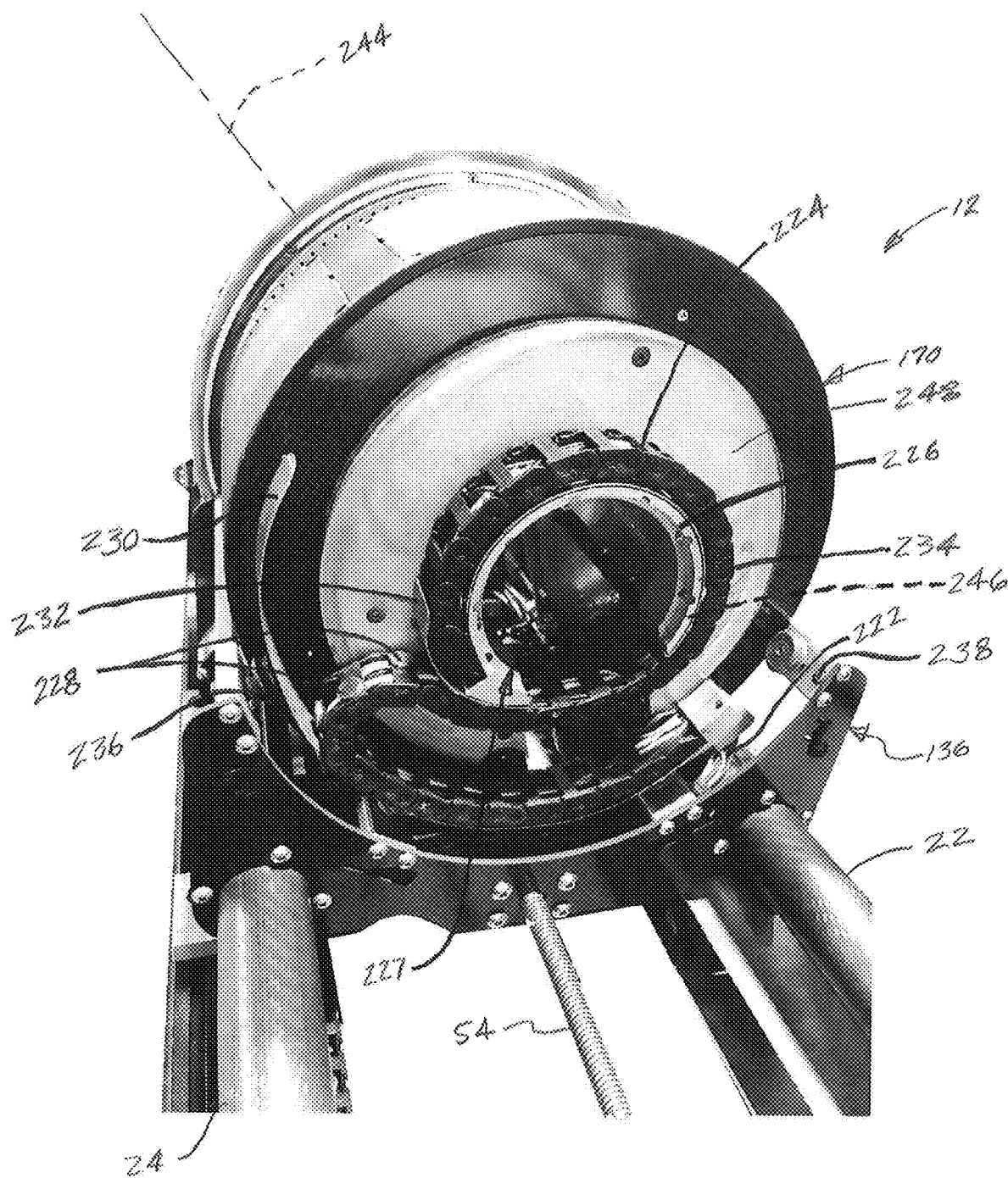
FIG. 16 shows a portion of the tool-plate assembly with a flexible cable carrier wrapped around a hub in one direction.

FIG. 16 shows a back side of the live-end assembly 12. In particular, it shows a portion of the tool-plate assembly 170 having an end plate 220—see FIG. 18—removed. Because the various tools and sensors associated with the live-end assembly 12 may require wires for power and communication, one of the issues that needs to be addressed is how to manage the wires when the live-end assembly 12 rotates. FIG. 16 shows a number of wires 222 contained within an elongated flexible cable carrier 224. The cable carrier 224 is configured as a chain having jointed links that facilitates rotation in clockwise and counterclockwise directions. As shown in FIG. 16, the tool-plate assembly 170 has been rotated in a counterclockwise direction, thereby wrapping the cable carrier 224 around a hub 226 of the tool-plate assembly 170. As shown in FIG. 16, the hub 226 is disposed proximate to a center portion 227 of the live-end assembly 12. Because embodiments of a live-end assembly, such as the live-end assembly 12, may rotate 360° or more in either direction, it is desirable to guide the cable carrier 224 so that it does not fold back onto itself or otherwise bind, which could lead to an undesirable amount of stress on the links of the cable carrier 224.

Figure 17:
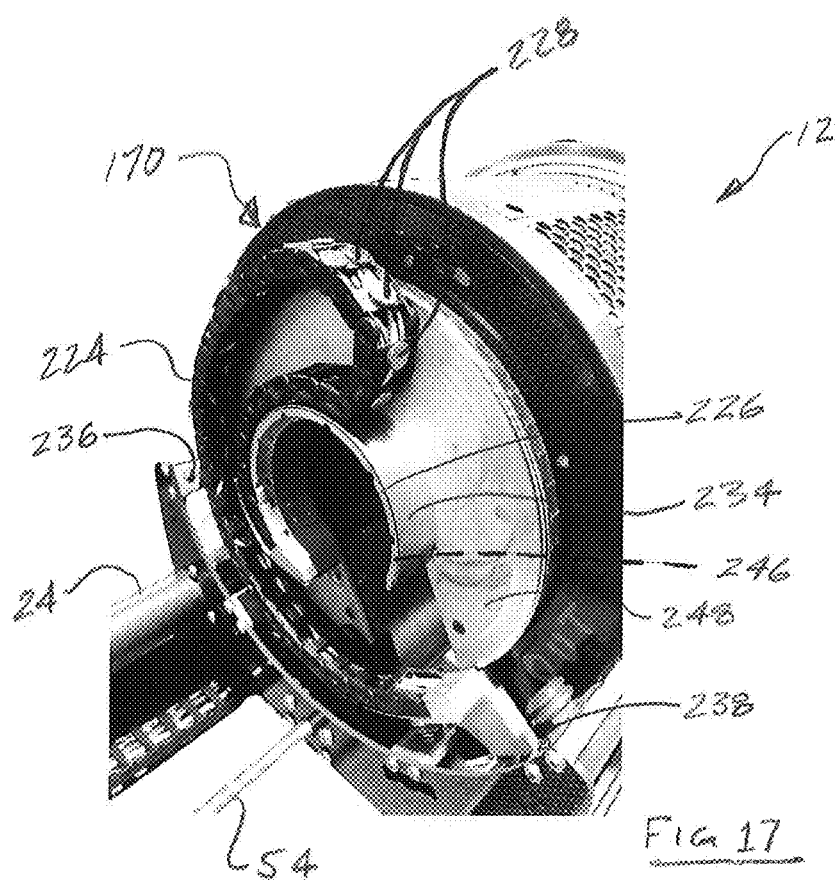
FIG. 17 shows a portion the tool-plate assembly with the flexible cable carrier wrapped around the hub in the opposite direction.

One way that managing the cable carrier 224 can be accomplished is by attaching fasteners such as magnets 228 to the cable carrier 224 and providing steel guide strips 230, 232, 234 to which the magnets 228 may adhere. The magnets 228 secure a position of the cable carrier 224 when it is wound around the hub 226. Although only two of the magnets 228 are shown in FIG. 16, it is understood that the cable carrier 224 may be provided with additional magnets 228 on the inside or outside of the links. For example, several of the magnets 228 may be placed on an inside of the cable carrier 224 so that it is securely attached to the metal guide strip 234 surrounding the hub 226. FIG. 17 shows the live-end assembly 12 after it has been rotated clockwise from the orientation shown in FIG. 16. In this view, the cable carrier 224 has started to unwind, revealing a number of the magnets 228 attached to the inside of the cable carrier 224, which now becomes an outside of the cable carrier 224 as its orientation changes. Although the fasteners used in this embodiment were magnets, other fasteners may be used, such as a hook-and-loop system or other device for maintaining a position of the cable carrier 224 while allowing it to be wrapped around and unwrapped from a hub 226 on the tool-plate assembly 170.

Although some embodiments of a live-end assembly, such as the live-end assembly 12, may have one or more mechanical stops to ensure that rotation does not go beyond a desired limit, other ways of ensuring a limited rotation may also be provided. In the embodiment shown in FIGS. 16 and 17, the live-end assembly 12 uses two limit switches 236, 238 to limit rotation of the tool-plate assembly 170. The limit switches 236, 238 work in conjunction with the end plate 220, and in particular, with tabs 240, 242, respectively. The limit switches 236, 238 are axially offset from each other—i.e., they are positioned at different points along a longitudinal axis 244 of the live-end assembly 12. Similarly, the tabs 240, 242 are also axially offset from each other at a distance that coincides with the distance between the limit switches 236, 238. In addition to the interaction between the tabs 240, 242 and the limit switches 236, 238, the tool-plate assembly 170 also includes a magnetic reed switch 246 positioned inside a housing 248 of the tool-plate assembly 170.

Figure 18:
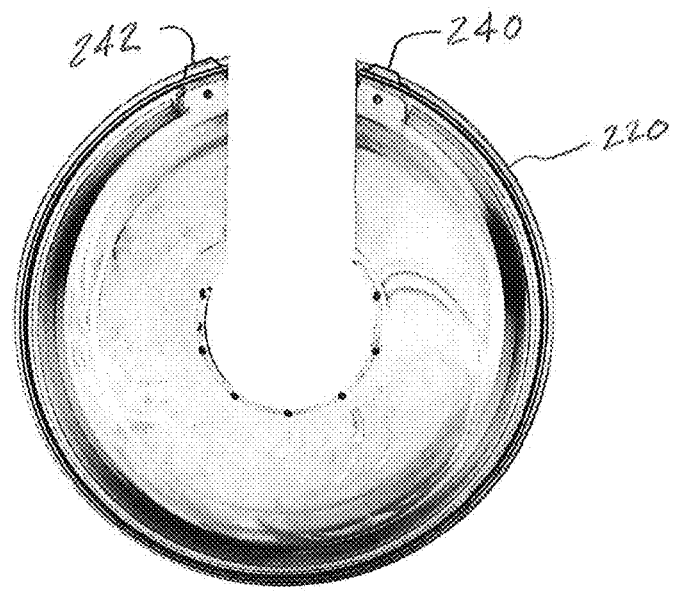
FIG. 18 shows an end plate for the tool-plate assembly.

As shown in FIG. 16, the cable carrier 224 is wrapped around the hub 226 so that one or more of the magnets 228 will be in close proximity to the reed switch 246, which will be actuated. This indicates that the tool-plate assembly 170 has been rotated in a counterclockwise orientation at least enough to have the cable carrier 224 cover the hub 226. When the end plate 220 is attached to the tool-plate assembly 170, the tabs 240, 242 will be oriented downward as shown in FIG. 16. In FIG. 18, the inside of the end plate 220 is shown such that when it is installed on the tool-plate assembly 170 with the tabs 240, 242 facing downward, the tab 242 will be on the left and the tab 240 will be on the right. Because the system 10 knows that the tool-plate assembly 170 is already rotated significantly in a counterclockwise direction, further counterclockwise rotation would cause the tab 242 to trip the limit switch 238, indicating that further rotation in that direction would be undesirable, and the system may prohibit further rotation of the tool-plate assembly 170 in the counterclockwise direction.

Figure 19:
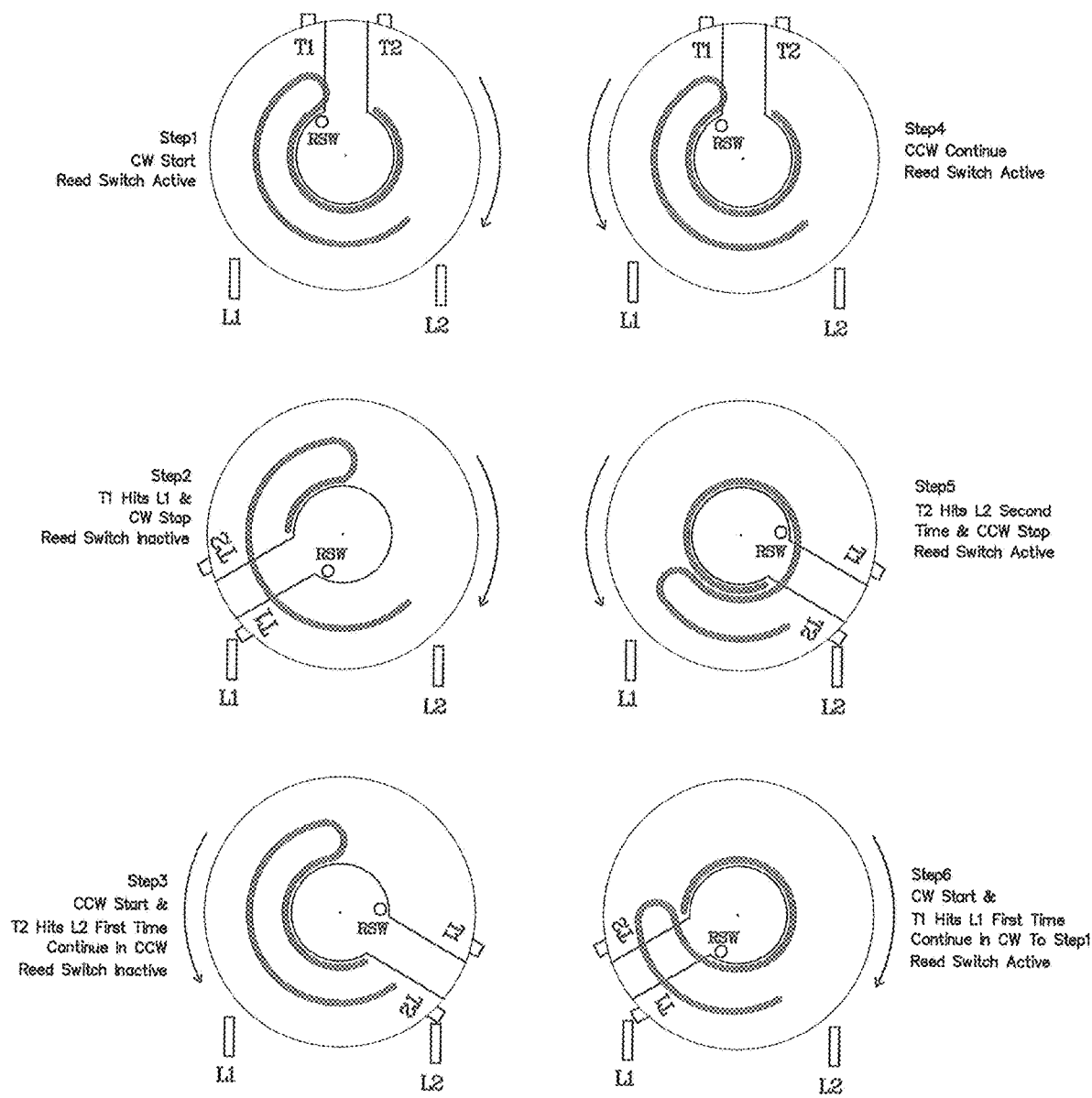
FIG. 19 shows operation of a rotation-limiting system for the tool-plate assembly

If the tool-plate assembly 170 is rotated in a clockwise direction, the cable carrier 224 will be unwound from the hub 226 and the reed switch 246 will be unactuated—see FIG. 17. This alerts the system 10 that the tool-plate assembly 170 has been rotated in a clockwise direction. If the tool-plate assembly 170 is further rotated in the clockwise direction, the tab 240 will trip the limit switch 236, indicating that further rotation in the clockwise direction would be undesirable, and the system may prohibit further clockwise rotation of the tool-plate assembly 170. FIG. 19 shows a sequence of clockwise and counterclockwise rotations of a tool-plate assembly and how the tabs T1 and T2, the limit switches L1 and L2, and the reed switch work together to ensure that rotation is properly limited. In FIG. 19 the outside of the end plate is shown, which is the opposite orientation from the end plate 220 shown in FIG. 18.

As shown in FIG. 11, the tool-plate assembly 170 includes an opening 250 that is configured as a slot along a length of the tool-plate assembly 170 and radially oriented between an outer portion 252 and a center portion 254 of the tool-plate assembly 170, and by extension the live-end assembly 12. In the embodiment shown in FIG. 11, the center portion 254 refers to a radial center of the tool-plate assembly 170, rather than a longitudinal center portion. The configuration of the opening 250 allows a cable, such as the cable 38, to be inserted into the live-end assembly 12 before it is cut. More specifically, it allows a cable to be inserted into the opening 250 in a direction transverse to a cable axis—see, e.g., the cable 38 having cable axis 251 in FIG. 1. As described above, the guide rollers 172 act as guide elements and support the cable so that the various tools of the live-end assembly 12 can perform work on the cable.

In order to position the cable in the center portion 254, the guide rollers 172 are movable into and away from the center portion 254. The guide rollers 172 are shown in more detail in FIG. 20. Specifically, the guide rollers 172 are shown to be part of a guide arrangement 256 that includes three pairs 258, 260, 262 of the guide rollers 172. Each of the pairs 258, 260, 262 is associated with a respective drive arrangement 264, 266, 268, which may be actuated to move the guide rollers 172 away from the center portion 254 to allow the cable to be inserted into the live-end assembly 12, and then actuated to move the guide rollers 172 toward the cable to secure it for subsequent operations. In the embodiment shown in FIG. 11, each of the guide elements is configured as a cylindrical guide roller 172; however, in other embodiments, some or all of the guide elements may have different shapes or may be stationary.

Figure 20:
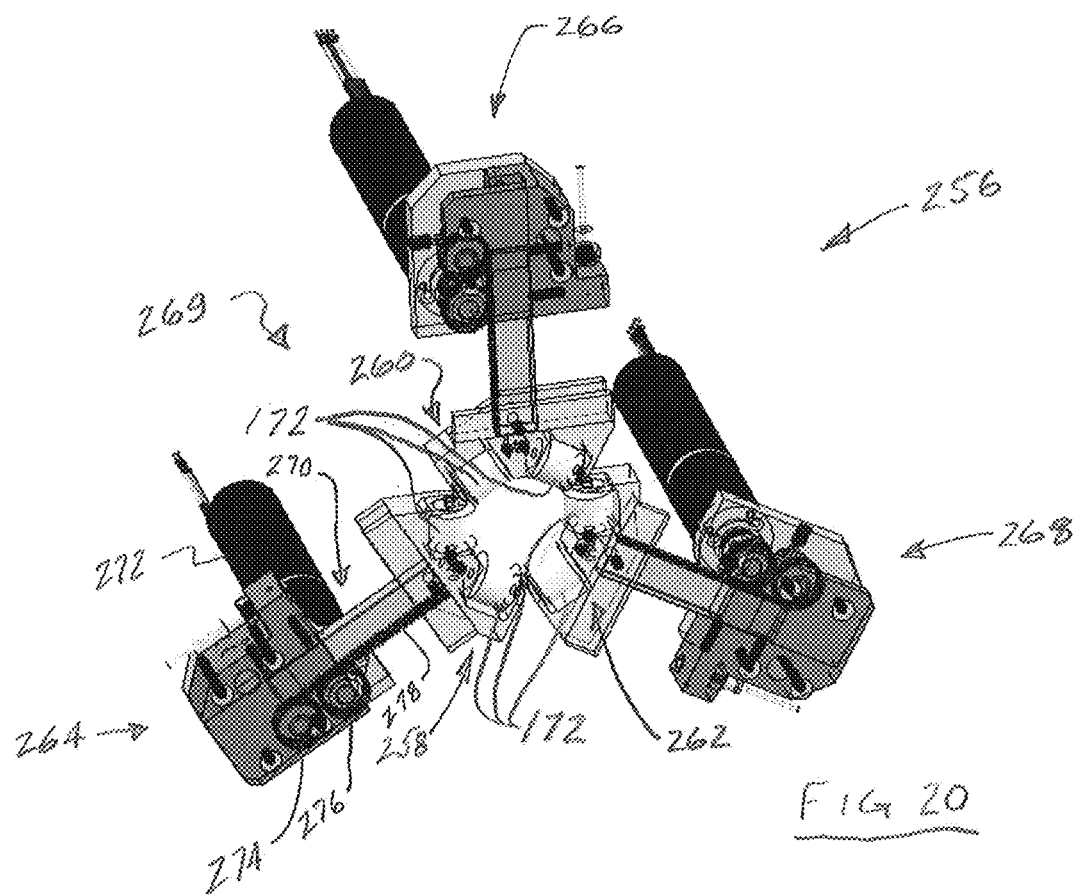
FIG. 20 shows details of a guide arrangement with a plurality of guide rollers.

In the embodiment shown in FIG. 20, each of the drive arrangements 264, 266, 268 is configured the same, and although they are identified separately as three different drive arrangements, they may be considered part of single drive arrangement 269, which controls movement of the guide arrangement 256 and all of the guide rollers 172. Using the drive arrangement 264 as an example of the operation of all three drive arrangements 264, 266, 268, it includes a rack-and-pinion arrangement 270 having a motor 272, which drives to pinion gears 274, 276 along a rack 278 to move the pair 258 of guide rollers 172 radially inward and outward. In other embodiments, guide arrangements may be configured differently, for example, with a drive screw or other linear actuating arrangement, such as a pneumatic or hydraulic cylinder. Each of the pairs of guide rollers 258, 260, 262 is separately movable inward and outward. This helps to accurately position a cable for the required operations. Specifically, it may be important that the cable has a constant radial position relative to the tools on the live-end assembly while it is being cut and the various insulating and conducting layers are being prepared to receive the end-cap.

The configuration of guide rollers 172 with their associated drive arrangements 264, 266, 268 provides that secure positioning.

Figure 21:
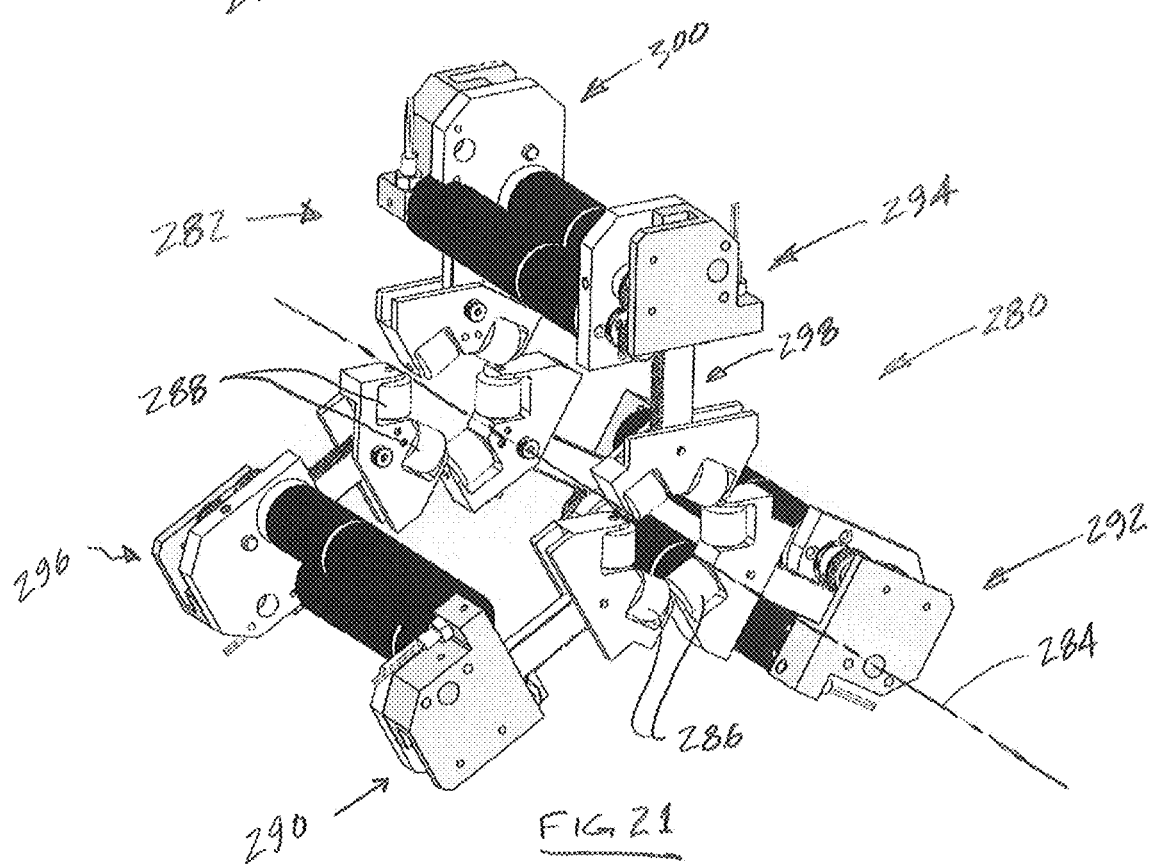
FIG. 21 shows a pair of guide arrangements spaced axially from each other.

A large electrical cable may contain residual stresses that cause the cable to curl or otherwise move out of a straight alignment after it is cut. Therefore, in some embodiments it may be desirable to include two sets of guide arrangements, such as the guide arrangement 256. FIG. 21 shows a configuration in accordance with embodiments described herein that includes two guide arrangements 280, 282 axially spaced from each other along an axis 284, which is coincident with an axis of a cable secured in the guide arrangements 280, 282—see, for example, the cable axis 251 in FIG. 1. The guide arrangement 280 includes guide elements, or guide rollers 286, and the guide arrangement 282 includes guide elements, or guide rollers 288, not all of which are labeled for clarity.

The guide elements 286 and the guide elements 288 are disposed symmetrically around the axis 284, which helps to ensure that a cable captured in the guide arrangements 280, 282 will be securely held in place by the guide elements 286, 288 when the tools from a live-end assembly, such as the live-end assembly 12, are operating on the cable. Each of the guide arrangements 280, 282 is configured similarly to the guide arrangement 256 shown in FIG. 20, and respectively includes drive arrangements 290, 292, 294 and drive arrangements 296, 298, 300. Including more than one of the guide arrangements, such as the guide arrangements 280, 282, positioned axially from each other along the cable helps to stabilize the cable and keep it accurately positioned. Accurate positioning, including keeping the cable straight, may be important for a number of reasons. For example, the tools of a live-end assembly, such as the tools 142, 144, 146, 148, 152, 154 of the live-end assembly 12, are designed to operate in a specific orientation and direction. A cutting edge of a cutting tool will be positioned in a fixed orientation relative to a straight cable. If the cable is bent, the cutting edge will no longer possess the correct orientation to perform the cut. Also, the tool may no longer be able to reach the cable. Hence, use of guide elements, such as the guide elements 286, 288, to straighten the cable may be required to properly prepare the cable for installation of the end cap. In addition, having a straight cable end can be necessary for the application of the end cap after the cable is prepared.

Figure 22:
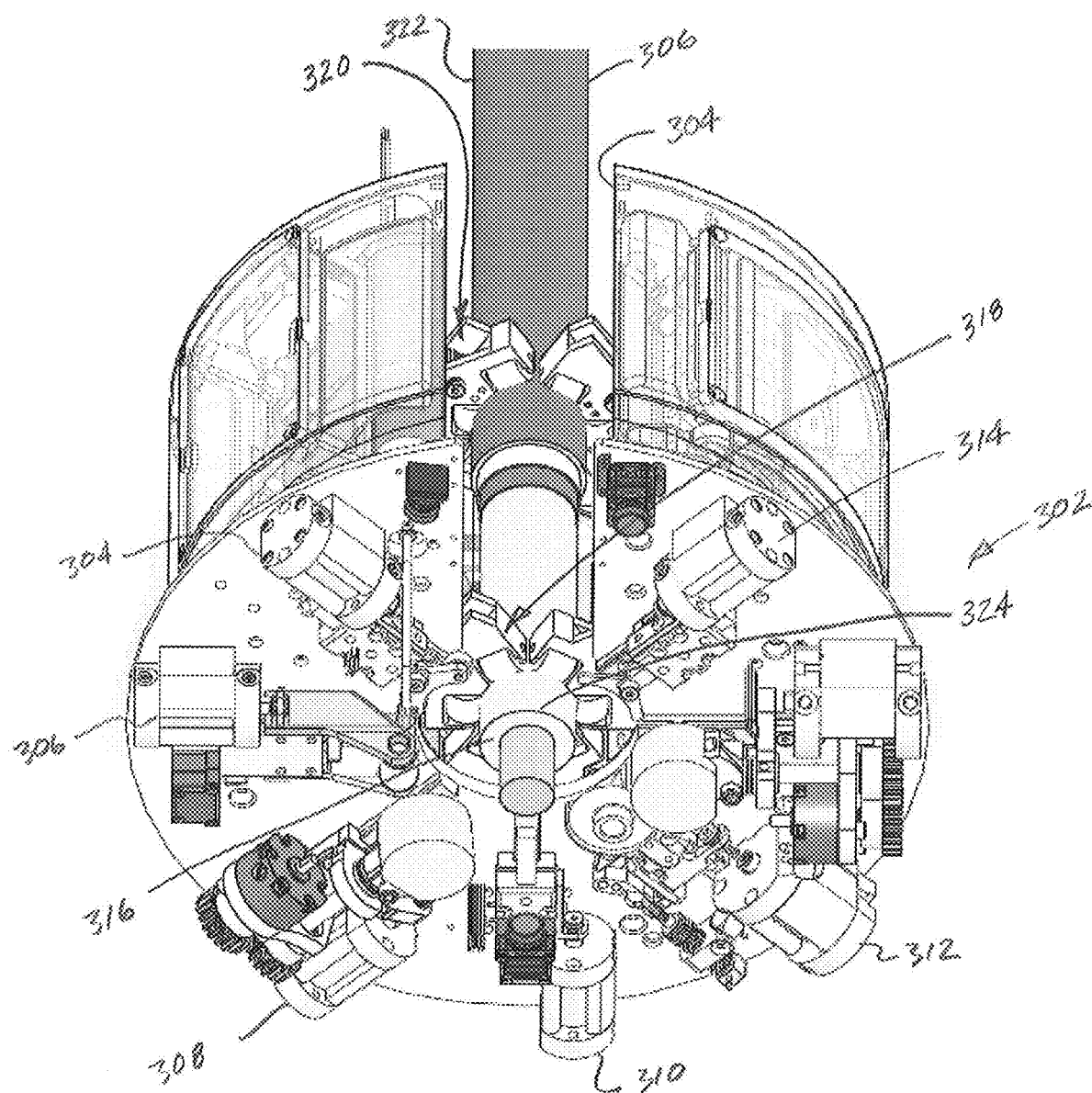
FIG. 22 shows a live-end assembly having two guide arrangements securing a cut end of an electrical cable.

FIG. 22 shows a live-end assembly 302 that includes an opening 304 configured to receive a cable 306. Similar to the live-end assembly 12, the live-end assembly 302 includes a plurality of tools 304, 306, 308, 310, 312, 314 configured to perform one or more operations on the cable 306. As shown in FIG. 22, the cable 306 already has one end 316 prepared to receive an end-cap. In the embodiment shown in FIG. 22, however, the live-end assembly 302 includes two guide arrangements 318, 320 spaced apart from each other axially along the length of the cable 306. As shown in FIG. 22, the guide arrangement 320 is clamped securely on the outer insulation 322 of the cable 306, while the guide arrangement 318 is secured to an inner insulating layer 324 of the cable 306.

In the embodiment shown in FIG. 22, the first guide arrangement 318 is associated with the tools 304, 306, 308, 310, 312, 314, while the second guide arrangement 320 is not associated with any tools and merely provides additional clamping to secure the cable 306 in a desired position. As shown in FIG. 22, both guide arrangements 318, 320 are part of the live-end assembly 302, but in other embodiments, guide arrangements, such as the guide arrangements 318, 320, may be separate from any tool arrangement and may be, for example, separately supported on a support structure, such as the chassis 16—see FIG. 1. In some embodiments, a cable may be positioned so that its cut end extends farther outward from the guide arrangement 318, in which case another guide arrangement may be positioned in front of the tools to further stabilize and accurately position the cable end.

In the embodiments shown in FIGS. 20-22, the guide arrangements 256, 280, 318, 320 are all configured with three pairs of guide elements, which in these embodiments are guide rollers. In other embodiments, however, a set of guide elements may not be arranged in a pair; they may include a single guide element in each set, or three or more guide elements in each set. In addition, less than three sets or more than three sets of the guide elements may be used, although three sets symmetrically positioned around a cable axis—such as shown in FIGS. 20-22—may be desirable. In the embodiments shown in FIGS. 20-22, each of the sets of guide elements is independently movable. In other embodiments, some or all of the guide elements may move together, and in some embodiments, one or more of the sets of guide elements may be stationary. In some embodiments, a system, such as the system 10, may include a plurality of live-end assemblies, two or more of which may include one or more guide arrangements and associated sets of tools. In some embodiments, multiple guide arrangements may be positioned at a fixed axial distance from each other, while in others, one or both of the guide arrangements may be movable axially relative to the other to provide optimal positioning for securing a cable and positioning it for the work to be performed by the tools and the application of an end-cap.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for servicing cable, comprising:
   a support structure;
   a first tool arrangement supported on the support structure and including an opening configured to receive a cable in a direction transverse to a cable axis and at least one tool operable to perform one or more operations on the cable received in the opening;
   a second tool arrangement supported on the support structure, including at least one tool operable to perform one or more operations on the cable received by the first tool arrangement, at least one of the first or second tool arrangement being movable axially along the support structure relative to the other tool arrangement;
   a guide arrangement including a plurality of guide elements; and
   a drive arrangement configured to move at least one of the guide elements into contact with and apply a force to the cable received by the first tool arrangement, the drive arrangement being operable to vary the force to adjust a position of the cable received by the first tool arrangement.

2. The system of claim 1, wherein the at least one tool of the second tool arrangement includes a cradle configured to receive an end cap and movable to align the end cap with the cable received by the first tool arrangement, the cradle being movable axially to position the end cap over a cut end of the cable received by the first tool arrangement.

3. The system of claim 1, wherein the at least one tool of the first tool arrangement includes a rolling tool having a roller and an actuator operable to bring the roller into contact with the cable received by the first tool arrangement, the rolling tool further including a drive mechanism operable to rotate the roller to remove a portion of the cable received by the first tool arrangement.

4. The system of claim 1, wherein the at least one tool with the second tool arrangement includes a drilling-and-shorting assembly having a drill bit and a test arrangement and configured to operate the drill bit to drill first and second holes at least partially through the cable received by the first tool arrangement, the drilling-and-shorting assembly being further configured to eject the drill bit in the second hole and to position a portion of the test arrangement in the first hole, the test arrangement being configured to send a signal to a remote position indicative of continuity between two conductors contacted by the drill bit in the second hole.

5. The system of claim 1, wherein the system further comprises a plurality of the guide arrangements, each of the guide arrangements being spaced axially from each of the other guide arrangements.

6. The system of claim 1, wherein the first tool arrangement is rotatable and the at least one tool of the first tool arrangement includes a plurality of wires connected thereto, the first tool arrangement further including an elongated flexible cable carrier configured to receive the wires therein and to be selectively wound around and unwound from a hub of the first tool arrangement.

7. The system of claim 6, wherein at least one of the cable carrier or the hub includes at least one fastener configured to selectively secure a position of the cable carrier when the cable carrier is wound around the hub and to release the cable carrier when the cable carrier is unwound from the hub.

8. The system of claim 7, wherein the at least one fastener includes a plurality of magnets.

9. The system of claim 1, wherein the first tool arrangement includes a center portion and the guide elements are positioned around the center portion, and wherein the drive arrangement is configured to move the at least one of the guide elements radially relative to the center portion.

10. The system of claim 1, wherein the guide elements are movable radially outward away from a center portion of the first tool arrangement to facilitate positioning of the cable in the opening, and movable radially inward toward the center portion to exert forces on and secure the cable in the opening of the first tool arrangement, at least one of the guide elements being separately movable from at least one other of the guide elements such that a position of the cable in the opening of the first tool arrangement is adjustable by the guide elements.

11. The system of claim 1, further comprising a heater for heating the cable received by the first tool arrangement.

12. The system of claim 1, wherein the guide arrangement further includes a plurality of drive arrangements operable to move respective guide elements toward and away from a center portion of the first tool arrangement.

13. The system of claim 12, wherein the guide arrangement includes three of the drive arrangements arranged symmetrically around the center portion of the first tool arrangement, each of the drive arrangements being separately operable to independently move the respective guide elements toward and away from the center portion of the first tool arrangement.

\* \* \* \* \*